United States Patent
Koponen et al.

(10) Patent No.: US 10,661,342 B2
(45) Date of Patent: May 26, 2020

(54) ADDITIVE MANUFACTURING SYSTEMS AND METHODS FOR THE SAME

(71) Applicant: nLIGHT, Inc., Vancouver, WA (US)

(72) Inventors: Joona Koponen, Vantaa (FI); Dahv A. V. Kliner, Portland, OR (US); Roger Farrow, Vancouver, WA (US)

(73) Assignee: nLIGHT, Inc., Vancouver, WA (US)

( * ) Notice: Subject to any disclaimer, the term of this patent is extended or adjusted under 35 U.S.C. 154(b) by 0 days.

(21) Appl. No.: 15/939,090

(22) Filed: Mar. 28, 2018

(65) Prior Publication Data

US 2018/0214951 A1 Aug. 2, 2018

Related U.S. Application Data

(63) Continuation-in-part of application No. 15/607,411, filed on May 26, 2017, now Pat. No. 10,295,845, and
(Continued)

(51) Int. Cl.
*B22F 3/10* (2006.01)
*B22F 3/105* (2006.01)
(Continued)

(52) U.S. Cl.
CPC .......... *B22F 3/1055* (2013.01); *B23K 26/073* (2013.01); *B23K 26/0732* (2013.01); *B23K 26/0736* (2013.01); *B23K 26/082* (2015.10); *B23K 26/0853* (2013.01); *B23K 26/144* (2015.10); *B23K 26/1476* (2013.01);
(Continued)

(58) Field of Classification Search
CPC ..................................................... B22F 3/1055
See application file for complete search history.

(56) References Cited

U.S. PATENT DOCUMENTS 4,252,403 A * 2/1981 Salisbury ............... G02B 6/262
385/124
4,266,851 A * 5/1981 Salisbury ............. G02B 6/2551
250/227.24
(Continued)

FOREIGN PATENT DOCUMENTS

CN 101907742 A * 12/2010
CN 101907742 B * 7/2012
(Continued)

OTHER PUBLICATIONS

Bergmann et al., Effects of diode laser superposition on pulsed laser welding of Aluminum, Lasers in Manufacturing Conference 2013, Physics Procedia 41 ( 2013 ) 180-189 (Year: 2013).*
(Continued)

*Primary Examiner* — Peter Radkowski

(57) ABSTRACT

Additive manufacturing systems and methods for fabricating an article are provided. The additive manufacturing system may include a substrate and a layering device configured to fabricate a first layer of the article on the substrate. The layering device may include an optical beam source configured to generate an optical beam and a variable beam characteristics (VBC) fiber operably coupled with the optical beam source and configured to modify one or more beam characteristics, such as a wavelength, of the optical beam.

21 Claims, 20 Drawing Sheets

Related U.S. Application Data a continuation-in-part of application No. 15/607,410, filed on May 26, 2017, and a continuation-in-part of application No. 15/607,399, filed on May 26, 2017, and a continuation-in-part of application No. PCT/US2017/034848, filed on May 26, 2017.

(60) Provisional application No. 62/401,650, filed on Sep. 29, 2016.

(51) Int. Cl.

| | | |
|---|---|---|
| *G02B 27/09* | (2006.01) | |
| *G02F 1/01* | (2006.01) | |
| *B33Y 30/00* | (2015.01) | |
| *B23K 26/073* | (2006.01) | |
| *B33Y 10/00* | (2015.01) | |
| *B23K 26/08* | (2014.01) | |
| *B23K 26/342* | (2014.01) | |
| *B23K 26/144* | (2014.01) | |
| *B23K 26/14* | (2014.01) | |
| *B23K 26/082* | (2014.01) | |
| *G02B 6/14* | (2006.01) | |
| *B29C 64/153* | (2017.01) | |
| *B29C 64/268* | (2017.01) | |
| *G02B 6/028* | (2006.01) | |
| *G02B 6/42* | (2006.01) | |
| *G02B 6/12* | (2006.01) | |
| *G02F 1/015* | (2006.01) | |
| *G02B 6/26* | (2006.01) | |
| *G02B 6/036* | (2006.01) | |

(52) U.S. Cl.
CPC .......... *B23K 26/342* (2015.10); *B29C 64/153* (2017.08); *B29C 64/268* (2017.08); *B33Y 10/00* (2014.12); *B33Y 30/00* (2014.12); *G02B 6/14* (2013.01); *G02B 27/0927* (2013.01); *G02B 27/0933* (2013.01); *G02B 27/0994* (2013.01); *G02F 1/0115* (2013.01); *G02B 6/0281* (2013.01); *G02B 6/0365* (2013.01); *G02B 6/03616* (2013.01); *G02B 6/03627* (2013.01); *G02B 6/03633* (2013.01); *G02B 6/03638* (2013.01); *G02B 6/03688* (2013.01); *G02B 6/262* (2013.01); *G02B 6/4296* (2013.01); *G02B 2006/12121* (2013.01); *G02F 2001/0151* (2013.01)

(56) References Cited

U.S. PATENT DOCUMENTS

| | | | | |
|---|---|---|---|---|
| 4,475,027 A * | 10/1984 | Pressley | ............. | B23K 26/0732 219/121.6 |
| 5,153,773 A * | 10/1992 | Muraki | ................ | G02B 3/0056 359/211.1 |
| 5,475,415 A * | 12/1995 | Noethen | ..................... | B41J 2/45 347/238 |
| 5,864,430 A * | 1/1999 | Dickey | ................ | B23K 26/073 219/121.69 |
| 5,986,807 A * | 11/1999 | Fork | ..................... | G02B 5/1876 359/566 |
| 6,433,301 B1 * | 8/2002 | Dunsky | ................ | B23K 26/073 219/121.67 |
| 6,483,973 B1 * | 11/2002 | Mazzarese | .......... | H01S 3/06708 372/6 |
| 6,496,301 B1 * | 12/2002 | Koplow | ................... | G02B 6/14 359/337 |
| 6,639,177 B2 * | 10/2003 | Ehrmann | ............. | B23K 26/032 219/121.68 |
| 6,779,364 B2 * | 8/2004 | Tankala | ............ | C03B 37/01211 65/390 |
| 6,989,508 B2 * | 1/2006 | Ehrmann | ............. | B23K 26/032 219/121.73 |
| 7,116,887 B2 * | 10/2006 | Farroni | ............. | C03B 37/01217 385/142 |
| 7,157,661 B2 * | 1/2007 | Amako | ............. | B23K 26/0608 219/121.73 |
| 7,257,293 B1 * | 8/2007 | Fini | ......... | G02B 6/02 385/123 |
| 7,463,805 B2 * | 12/2008 | Li | ....... | H01S 3/06708 385/123 |
| 7,526,166 B2 * | 4/2009 | Bookbinder | ....... | G02B 6/02366 385/123 |
| 7,537,395 B2 * | 5/2009 | Savage-Leuchs | .... | G02B 6/4296 372/6 |
| 7,876,495 B1 * | 1/2011 | Minelly | .............. | C03B 37/0122 359/341.1 |
| 7,924,500 B1 * | 4/2011 | Minelly | ................. | G02B 6/023 359/341.1 |
| 8,184,363 B2 * | 5/2012 | Rothenberg | ....... | G02B 6/02042 359/349 |
| 8,711,471 B2 * | 4/2014 | Liu | .......... | G02B 6/14 359/337 |
| 8,728,591 B2 * | 5/2014 | Inada | ...... | G02B 1/04 428/1.31 |
| 9,170,367 B2 * | 10/2015 | Messerly | ................ | G02B 6/02 |
| 9,250,390 B2 | 2/2016 | Muendel et al. | | |
| 9,322,989 B2 * | 4/2016 | Fini | ...... | G02B 6/0288 |
| 9,325,151 B1 * | 4/2016 | Fini | ......... | H01S 3/102 |
| 9,339,890 B2 * | 5/2016 | Woods | ................ | B23K 26/06 |
| 9,366,887 B2 * | 6/2016 | Tayebati | ................. | G02F 1/295 |
| 2002/0146202 A1 * | 10/2002 | Reed | .................... | A61B 5/0084 385/34 |
| 2002/0158052 A1 * | 10/2002 | Ehrmann | ............. | B23K 26/032 219/121.69 |
| 2003/0059184 A1 * | 3/2003 | Tankala | ............. | C03B 37/01211 385/123 |
| 2003/0095578 A1 * | 5/2003 | Kopp | ................. | G02B 6/02085 372/6 |
| 2004/0086245 A1 * | 5/2004 | Farroni | ............. | C03B 37/01217 385/123 |
| 2004/0208464 A1 * | 10/2004 | Po | .......... | G02B 6/032 385/123 |
| 2005/0017156 A1 * | 1/2005 | Ehrmann | ............. | B23K 26/032 250/216 |
| 2005/0265678 A1 * | 12/2005 | Manyam | ............ | G02B 6/02033 385/127 |
| 2006/0054606 A1 * | 3/2006 | Amako | ............. | B23K 26/0608 219/121.73 |
| 2007/0104436 A1 * | 5/2007 | Li | ....... | H01S 3/06708 385/125 |
| 2007/0104438 A1 * | 5/2007 | Varnham | ............. | H01S 3/06708 385/126 |
| 2007/0147751 A1 * | 6/2007 | Fini | .................... | G02B 6/02009 385/123 |
| 2007/0178674 A1 * | 8/2007 | Imai | ................ | B23K 26/0604 438/487 |
| 2007/0195850 A1 * | 8/2007 | Schluter | ................ | H01S 5/4025 372/50.124 |
| 2008/0037604 A1 * | 2/2008 | Savage-Leuchs | .... | G02B 6/4296 372/44.01 |
| 2008/0181567 A1 * | 7/2008 | Bookbinder | ....... | G02B 6/02366 385/127 |
| 2009/0034059 A1 * | 2/2009 | Fini | .................... | G02B 6/02023 359/341.3 |
| 2009/0059353 A1 * | 3/2009 | Fini | .................... | G02B 6/02009 359/341.3 |
| 2009/0127477 A1 * | 5/2009 | Tanaka | ............... | B23K 26/0738 250/492.22 |
| 2010/0163537 A1 * | 7/2010 | Furuta | ............... | B23K 26/38 219/121.72 |
| 2011/0032602 A1 * | 2/2011 | Rothenberg | ....... | G02B 6/02042 359/341.1 |
| 2011/0058250 A1 * | 3/2011 | Liu | .......... | G02B 6/14 359/341.3 |
| 2011/0163077 A1 * | 7/2011 | Partlo | ............ | B23K 26/0732 219/121.66 |

(56) References Cited

U.S. PATENT DOCUMENTS

| | | | |
|---|---|---|---|
| 2011/0297229 A1* | 12/2011 | Gu | G02B 6/4298 |
| | | | 136/259 |
| 2012/0009511 A1 | 1/2012 | Dmitriev | |
| 2012/0082410 A1* | 4/2012 | Peng | G02B 6/02304 |
| | | | 385/11 |
| 2012/0168411 A1* | 7/2012 | Farmer | G02B 19/0052 |
| | | | 219/121.67 |
| 2012/0329974 A1* | 12/2012 | Inada | G02B 1/04 |
| | | | 527/303 |
| 2013/0134637 A1 | 5/2013 | Wiesner et al. | |
| 2013/0146569 A1* | 6/2013 | Woods | B23K 26/06 |
| | | | 219/121.64 |
| 2013/0148925 A1* | 6/2013 | Muendel | G02B 6/32 |
| | | | 385/27 |
| 2013/0202264 A1* | 8/2013 | Messerly | G02B 6/02 |
| | | | 385/123 |
| 2013/0223792 A1* | 8/2013 | Huber | B23K 26/073 |
| | | | 385/18 |
| 2013/0251324 A1* | 9/2013 | Fini | G02B 6/02009 |
| | | | 385/124 |
| 2013/0343703 A1* | 12/2013 | Genier | G02B 6/32 |
| | | | 385/33 |
| 2014/0205236 A1* | 7/2014 | Noguchi | G02B 6/2835 |
| | | | 385/33 |
| 2014/0334788 A1* | 11/2014 | Fini | G02B 6/0283 |
| | | | 427/163.2 |
| 2015/0316716 A1* | 11/2015 | Fini | G02B 6/02009 |
| | | | 385/124 |
| 2015/0378184 A1* | 12/2015 | Tayebati | G02F 1/295 |
| | | | 250/492.1 |
| 2016/0013607 A1* | 1/2016 | McComb | H01S 3/06704 |
| | | | 372/6 |
| 2016/0059354 A1* | 3/2016 | Sercel | B23K 26/38 |
| | | | 264/400 |

FOREIGN PATENT DOCUMENTS

| | | |
|---|---|---|
| CN | 105383060 A | 3/2016 |
| JP | H11287922 A | 10/1999 |
| JP | H11344636 A | 12/1999 |
| JP | 2005070608 A | 3/2005 |
| JP | 2016201558 A | 12/2016 |
| WO | 2012165389 A1 | 12/2012 |
| WO | 2015156281 A1 | 10/2015 |

OTHER PUBLICATIONS

CAILabs, Canuda, Application Note, 2015 (Year: 2015).*
CAILabs, Canuda, Application note, Flexible high-power laser beam shaping (Year: 2015).*
J. M. Daniel, J. S. Chan, J. W. Kim, M. Ibsen, J. Sahu, and W. A. Clarkson, "Novel Technique for Mode Selection in a Large-Mode-Area Fiber Laser," in Conference on Lasers and Electro-Optics 2010, OSA Technical Digest (CD) (Optical Society of America, 2010), paper CWCS (Year: 2010).*
J. M. O. Daniel, J. S. P. Chan, J. W. Kim, J. K. Sahu, M. Ibsen, and W. A. Clarkson, "Novel technique for mode selection in a multimode fiber laser," Opt. Express 19, 12434-12439 (2011) (Year: 2011).*
Faidel et al., Improvement of selective laser melting by beam shaping and minimized thermally induced effects in optical systems, 9th International Conference on Photonic Technologies LANE 2016 (Year: 2016).*
John M. Fini, "Bend-compensated design of large-mode-area fibers," Opt. Lett. 31, 1963-1965 (2006) (Year: 2006).*
John M. Fini and Jeffrey W. Nicholson, "Bend compensated large-mode-area fibers: achieving robust single-modedness with transformation optics," Opt. Express 21, 19173-19179 (2013) (Year: 2013).*
John M. Fini, "Large mode area fibers with asymmetric bend compensation," Opt. Express 19, 21866-21873 (2011) (Year: 2011).*
Garcia et al., Fast adaptive laser shaping based on multiple laser incoherent combining, Proc. SPIE 10097, High-Power Laser Materials Processing: Applications, Diagnostics, and Systems VI, 1009705 (Feb. 22, 2017); doi: 10.1117/12.2250303 (Year: 2017).*
Huang et al., "All-fiber mode-group-selective photonic lantern using graded-index multimode fibers," Opt. Express 23, 224-234 (2015) (Year: 2015).*
Jain et al., "Multi-Element Fiber Technology for Space-Division Multiplexing Applications," Opt. Express 22, 3787-3796 (2014) (Year: 2014).*
Jin et al., "Mode Coupling Effects in Ring-Core Fibers for Space-Division Multiplexing Systems," in Journal of Lightwave Technology, vol. 34, No. 14, pp. 3365-3372, Jul. 15, 15 2016. doi: 10.1109/JLT.2016.2564991 (Year: 2016).*
King et al., Observation of keyhole-mode laser melting in laser powder-bed fusion additive manufacturing, Journal of Materials Processing Technology 214 (2014) 2915-2925 (Year: 2014).*
D. A. V. Kliner, "Novel, High-Brightness, Fibre Laser Platform for kW Materials Processing Applications," in 2015 European Conference on Lasers and Electro-Optics—European Quantum Electronics Conference, (Optical Society of America, 2015), paper CJ_11_2. (Year: 2015).*
Kliner D.A.V., Bambha R.P., Do B.T., Farrow R.L., Feve J.-P., Fox B.P., Hadley G.R., Wien G., Overview of Sandia's fiber laser program (2008) Proceedings of SPIE—The International Society for Optical Engineering, 6952, (Year: 2008).*
Koplow et al., "Single-mode operation of a coiled multimode fiber amplifier," Opt. Lett. 25, 442-444 (2000) (Year: 2000).*
Laskin, Applying of refractive spatial beam shapers with scanning optics ICALEO, 941-947 (2011) (Year: 2011).*
Longhi et al., Self-focusing and nonlinear periodic beams in parabolic index optical fibres, Published May 4, 2004 o IOP Publishing Ltd Journal of Optics B: Quantum and Semiclassical Optics, vol. 6, No. 5 (Year: 2004).*
Mumtaz et al., Selective Laser Melting of thin wall parts using pulse shaping, Journal of Materials Processing Technology 210 (2010) 279-287 (Year: 2010).*
Putsch et al., Active optical system for laser structuring of 3D surfaces by remelting, Proc. SPIE 8843, Laser Beam Shaping XIV, 88430D (Sep. 28, 2013); doi: 10.1117/12.2023306 https://www.osapublishing.org/conference.cfm?meetingid=90&yr=2015 (Year: 2013).*
Sandia National Laboratories—Brochure (POC—D.A.V. Kliner); "Mode-Filtered Fiber Amplifier," 2007 (Year: 2007).*
SeGall et al., "Simultaneous laser mode conversion and beam combining using multiplexed volume phase elements," in Advanced Solid-State Lasers Congress, G. Huber and P. Moulton, eds., OSA Technical Digest (online) (Optical Society of America, 2013), paper AW2A.9. (Year: 2013).*
Thiel et al., Reliable Beam Positioning for Metal-based Additive Manufacturing by Means of Focal Shift Reduction, Lasers in Manufacturing Conference 2015. (Year: 2015).*
Wischeropp et al., Simulation of the effect of different laser beam intensity profiles on heat distribution in selective laser melting, Lasers in Manufacturing Conference 2015. (Year: 2015).*
Xiao et al., "Fiber coupler for mode selection and high-efficiency pump coupling," Opt. Lett. 38, 1170-1172 (2013) (Year: 2013).*
Ye et al., Mold-free fs laser shock micro forming and its plastic deformation mechanism, Optics and Lasers in Engineering 67 (2015) 74-82. (Year: 2015).*
Yu et al., Laser material processing based on non-conventional beam focusing strategies, 9th International Conference on Photonic Technologies LANE 2016 (Year: 2016).*
Zhirnov et al., Laser beam profiling: experimental study of its influence on single-track formation by selective laser melting, Mechanics & Industry 16, 709 (2015) (Year: 2015).*
Duocastella et al., Bessel and annular beams for materials processing, Laser Photonics Rev. 6, 607-621 (Year: 2012).*
Fuchs et al., Beam shaping concepts with aspheric surfaces, Proceedings vol. 9581, Laser Beam Shaping XVI; 95810L (2015) https://doi.org/10.1117/12.2186524 (Year: 2015).*
Li et al., High-quality near-field beam achieved in a high-power laser based on SLM adaptive beam-shaping system, Opt. Express 23, 681-689 (2015) (Year: 2015).*

(56) References Cited

OTHER PUBLICATIONS

Fleming Ove Olsen, 2011, Laser metal cutting with tailored beam patterns, available at, https://www.industrial-lasers.com/articles/print/volume-26/issue-5/features/laser-metal-cutting-with-tailored-beam-patterns.html (Year: 2011).*

Schulze et al., Mode Coupling in Few-Mode Fibers Induced by Mechanical Stress, Journal of Lightwave Technology, vol. 33, No. 21, Nov. 1, 2015 (Year: 2015).*

Balazic, Matej, Additive Manufacturing and 3D Printing LENS Technology, http://www.lortek.es/files/fab-aditiva/efesto-ik4-lortek-27th-november-2013.pdf (Year: 2013).*

Birks et al., The photonic lantern, Advances in Optics and Photonics 7, 107-167 (2015) (Year: 2015).*

Van Newkirk et al., Bending sensor combining multicore fiber with a mode-selective photonic lantern, Opt. Lett. 40, 5188-5191 (2015) (Year: 2015).*

Rocha, Ana. (2009). Modeling of Bend Losses in Single-Mode Optical Fibers. Conference: 7th Conference on Telecommunications—Conftele 2009 7th Conference on Telecommunications—Conftele 2009 (Year: 2009).*

Ivanov et al., Fiber-Optic Bend Sensor Based on Double Cladding Fiber, Journal of Sensors, vol. 2015, Article ID 726793. (Year: 2015).*

Oleg V Ivanov and Ivan V Zlodeev, Fiber structure based on a depressed inner cladding fiber for bend, refractive index and temperature sensing, 2014 Meas. Sci. Technol. 25 015201 (Year: 2014).*

Jollivet, Clemence, Specialty Fiber Lasers and Novel Fiber Devices, Doctoral Dissertation, University of Central Florida, 2014 (Year: 2014).*

Jollivet et al., Advances in Multi-Core Fiber Lasers, Invited Presentation, DOI: 10.1364/LAOP.2014.LM1D.3.,2014 (Year: 2014).*

Kosolapov et al., Hollow-core revolver fibre with a double-capillary reflective cladding, Quantum Electron. 46 267 (Year: 2016).*

Messerly, et al., Field-flattened, ring-like propagation modes, Optics Express, V. 21, N. 10, p. 12683 (Year: 2013).*

Messerly et al., Patterned flattened modes, Optics Letters, V. 38, N. 17, p. 3329 (Year: 2013).*

Salceda-Delgado et al., Compact fiber-optic curvature sensor based on super-mode interference in a seven-core fiber, Optics Letters, V. 40, N. 7, p. 1468, (Year: 2015).*

Zhang et al., Switchable multiwavelength fiber laser by using a compact in-fiber Mach-Zehnder interferometer, J. Opt. 14 (2012(045403) (Year: 2012).*

I. V. Zlodeev and O.V. Ivanov, Transmission spectra of a double-clad fibre structure under bending, Quantum Electronics 43 (6) 535-541 (2013) (Year: 2013).*

Tam et al., An imaging fiber-based optical tweezer array for microparticle array assembly, Appl. Phys. Lett. 84, 4289 (2004); https://doi.org/10.1063/1.1753062 (Year: 2004).*

International Search Report and Written Opinion for International Application No. PCT/US2018/024954, dated Aug. 23, 2018, 7 pages.

* cited by examiner

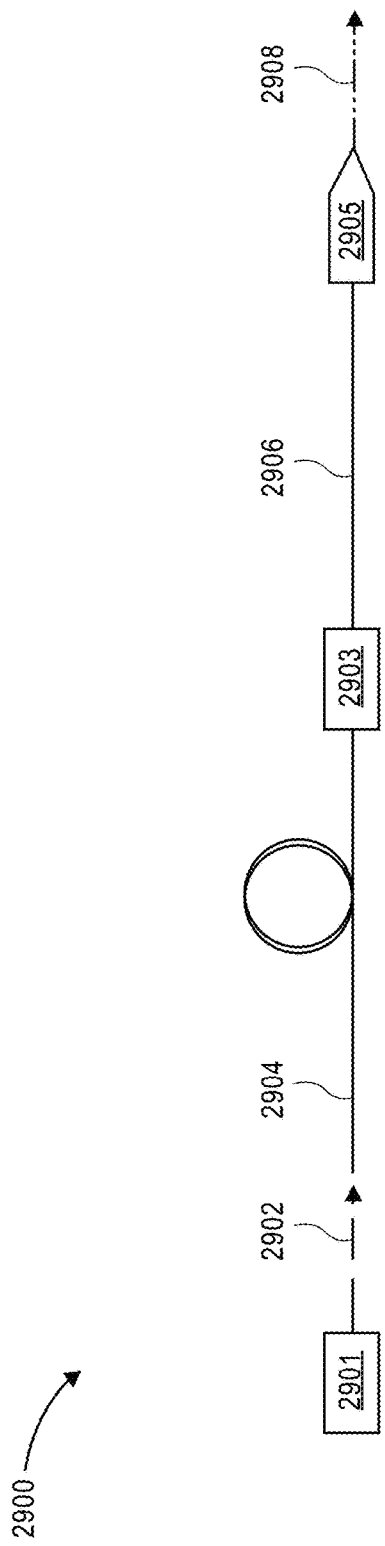
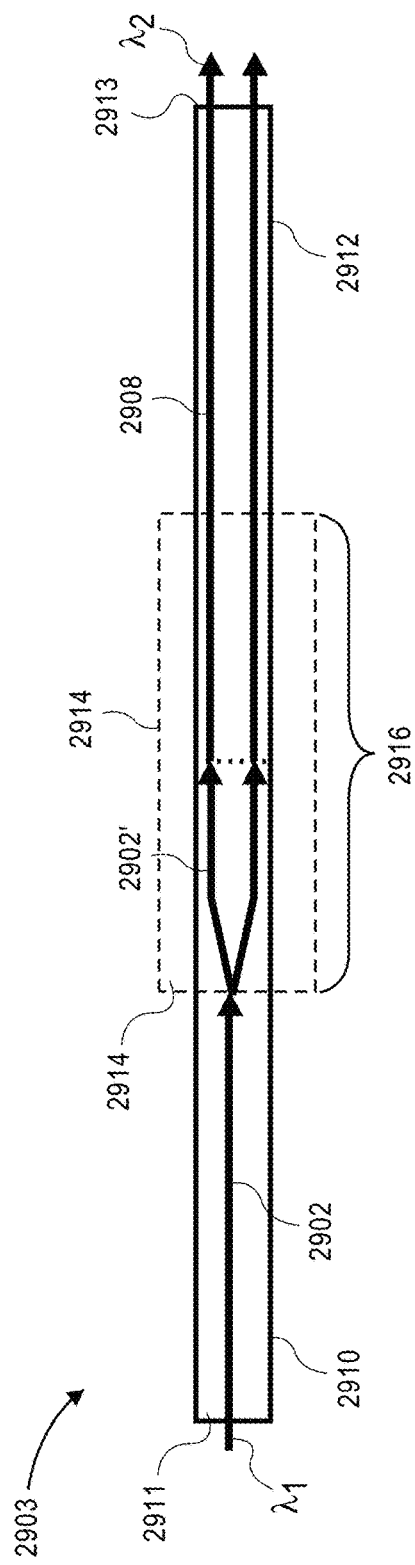
FIG. 29A
FIG. 29B

ADDITIVE MANUFACTURING SYSTEMS AND METHODS FOR THE SAME

RELATED APPLICATIONS

This application is a continuation-in-part of international application PCT/US2017/034848, filed May 26, 2017, which claims the benefit of U.S. Provisional Application No. 62/401,650, filed Sep. 29, 2016. This application is a continuation-in-part of U.S. patent application Ser. No. 15/607,411, filed May 26, 2017, which claims the benefit of U.S. Provisional Application No. 62/401,650, filed Sep. 29, 2016. This application is a continuation-in-part of U.S. patent application Ser. No. 15/607,410, filed May 26, 2017, which claims the benefit of U.S. Provisional Application No. 62/401,650, filed Sep. 29, 2016. This application is a continuation-in-part of U.S. patent application Ser. No. 15/607,399, filed May 26, 2017, which claims the benefit of U.S. Provisional Application No. 62/401,650, filed Sep. 29, 2016. All of the above applications are herein incorporated by reference in their entireties.

TECHNICAL FIELD

The technology disclosed herein relates to fiber lasers, and fiber-coupled lasers. More particularly, the disclosed technology relates to methods, apparatus, and systems for adjusting and maintaining adjusted optical beam characteristics (spot size, divergence profile, spatial profile, or beam shape, wavelength or the like or any combination thereof) of an optical beam at an output of a fiber laser or fiber-coupled laser.

BACKGROUND

The use of high-power fiber-coupled lasers continues to gain popularity for a variety of applications, such as materials processing, cutting, welding, and/or additive manufacturing. These lasers include, for example, fiber lasers, disk lasers, diode lasers, diode-pumped solid state lasers, and lamp-pumped solid state lasers. In these systems, optical power is delivered from the laser to a work piece via an optical fiber.

Various fiber-coupled laser materials processing tasks require different beam characteristics (e.g., wavelengths, spatial profiles and/or divergence profiles). For example, cutting thick metal and welding generally require a larger spot size than cutting thin metal. Ideally, the laser beam properties would be adjustable to enable optimized processing for these different tasks. Conventionally, users have two choices: (1) Employ a laser system with fixed beam characteristics that can be used for different tasks but is not optimal for most of them (i.e., a compromise between performance and flexibility); or (2) Purchase a laser system or accessories that offer variable beam characteristics but that add significant cost, size, weight, complexity, and perhaps performance degradation (e.g., optical loss) or reliability degradation (e.g., reduced robustness or up-time). Currently available laser systems capable of varying beam characteristics require the use of free-space optics or other complex and expensive add-on mechanisms (e.g., zoom lenses, mirrors, translatable or motorized lenses, combiners, etc.) in order to vary beam characteristics. No solution exists that provides the desired adjustability in beam characteristics that minimizes or eliminates reliance on the use of free-space optics or other extra components that add significant penalties in terms of cost, complexity, performance, and/or reliability.

Some laser processing applications require multiple wavelengths. For example, the variety of materials utilized in additive manufacturing may sinter at various temperatures; and thus, at varying wavelengths. Thus, it would be useful to have available a laser source capable of producing different wavelengths for additive manufacturing.

What is needed is an in-fiber apparatus for providing varying beam characteristics that does not require or minimizes the use of free-space optics and that can avoid significant cost, complexity, performance tradeoffs, and/or reliability degradation. Therefore, methods for controlling properties of lasers, while overcoming the limitations of conventional processes and systems, to provide improved articles would be a welcome addition to the art.

SUMMARY

At least disclosed herein are methods, systems and apparatus for varying optical beam characteristics. Methods may include, perturbing an optical beam propagating within a first length of fiber to adjust one or more beam characteristics of the optical beam in the first length of fiber or a second length of fiber or a combination thereof, coupling the perturbed optical beam into a second length of fiber and maintaining at least a portion of one or more adjusted beam characteristics within a second length of fiber having one or more confinement regions. Methods may further include generating a selected output beam from the second length of fiber having the adjusted beam characteristics responsive to a selection of a first refractive index profile (RIP) of the first length of fiber or a second RIP of the second length of fiber or a combination thereof. In some examples, the one or more beam characteristics of the perturbed optical beam are adjusted based on selection of one or more core dimensions of the first length of fiber or one or more confinement region dimensions of the second length of fiber or a combination thereof to generate an adjusted optical beam responsive to perturbing the first length of fiber, the adjusted optical beam having a particular adjusted: beam diameter, divergence distribution, beam parameter product (BPP), intensity distribution, luminance, $M^2$ value, numerical aperture (NA), optical intensity, power density, radial beam position, radiance, or spot size, or any combination thereof at an output of the second length of fiber. In some example, methods include perturbing the optical beam by bending the first length of fiber to alter a bend radius or alter a length of a bent region of the first length of fiber or a combination thereof such that one or more modes of the optical beam are displaced radially with respect to a longitudinal axis of the first length of fiber wherein the second length of fiber has an RIP that defines a first confinement region and a second confinement region. In some examples, the adjusted one or more beam characteristics are produced by confining the optical beam in the two or more confinement regions of the second length of fiber. The example methods may further comprise launching the perturbed optical beam from the first length of fiber into the first confinement region or the second confinement region or a combination thereof such that one or more displaced modes of the optical beam are selectively coupled into and maintained in the first confinement region or the second confinement region, or a combination thereof. Disclosed methods may include, perturbing the one or more beam characteristics of the optical beam by perturbing the first length of fiber or the optical beam in the first length of fiber or a combination thereof to adjust at least one beam characteristic of the optical beam at an output of the second length of fiber. Perturbing the first length of fiber may include bending, bending over a particular length, microbending, applying acousto-optic excitation, thermal perturbation, stretching, or applying piezo-electric perturbation, or any combination thereof. The second length of fiber may comprise a first confinement region comprising a central core and a second confinement region comprising an annular core encompassing the first confinement region. Adjusting the one or more beam characteristics of the optical beam may include selecting a RIP of the first length of fiber to generate a desired mode shape of a lowest order mode, one or more higher order modes, or a combination thereof subsequent to the adjusting. In some examples, the first length of fiber has a core with a parabolic index profile radially spanning some or all of the core. A RIP of the first length of fiber may be selected to increase or decrease a width of the lowest order mode, the higher order modes, or a combination thereof responsive to the perturbing the optical beam. The first length of fiber or the second length of fiber or a combination thereof may include at least one divergence structure configured to modify a divergence profile of the optical beam. The confinement regions may be separated by one or more cladding structures, wherein the divergence structure may be disposed within at least one confinement region separate from the cladding structure and comprising material having a lower index than the confinement region adjacent to the divergence structure. In some examples, the second length of fiber may be azimuthally asymmetric.

Apparatus disclosed herein may include an optical beam delivery device, comprising a first length of fiber comprising a first RIP formed to enable modification of one or more beam characteristics of an optical beam by a perturbation device and a second length of fiber having a second RIP coupled to the first length of fiber, the second RIP formed to confine at least a portion of the modified beam characteristics of the optical beam within one or more confinement regions. In some examples, the first RIP and the second RIP are different. In some examples, the second length of fiber comprises a plurality of confinement regions. The perturbation device may be coupled to the first length of fiber or integral with the first length of fiber or a combination thereof. The first length of fiber may comprise a graded-index RIP in at least a radially central portion and the second length of fiber has a first confinement region comprising a central core and a second confinement region that is annular and encompasses the first confinement region. The first confinement region and the second confinement region may be separated by a cladding structure having a refractive index that is lower than the indexes of first confinement region and the second confinement region. The cladding structure may comprise a fluorosilicate material. The first length of fiber or the second length of fiber or a combination thereof may include at least one divergence structure configured to modify a divergence profile of the optical beam and wherein the divergence structure may comprise a first material having a lower index of refraction than a second material encompassing the divergence structure. The second length of fiber may be azimuthally asymmetric and may comprise a first confinement region comprising a first core and a second confinement region comprising a second core. In some examples, the first confinement region and the second confinement region may be coaxial. In other examples, the first confinement region and the second confinement region may be non-coaxial. The second confinement region may be crescent shaped in some examples. The first RIP may be parabolic in a first portion having a first radius. In some examples, the first RIP may be constant in a second portion having a second radius, wherein the second radius is larger than the first radius. The first RIP may comprise a radially graded index extending to an edge of a core of the first length of fiber, wherein the first RIP is formed to increase or decrease a width of one or more modes of the optical beam responsive to the modification of the beam characteristics by the perturbation device. The first length of fiber may have a radially graded index core extending to a first radius followed by a constant index portion extending to a second radius, wherein the second radius is larger than the first radius. In some examples, the second length of fiber comprises a central core having a diameter in a range of about 0 to 100 microns, a first annular core encompassing the central core having a diameter in a range of about 10 to 600 microns and a second annular core having a diameter in a range of about 20 to 1200 microns. The perturbation device may comprise a bending assembly configured to alter a bend radius or alter a bend length of the first length of fiber or a combination thereof to modify the beam characteristics of the optical beam. In some examples, a perturbation assembly may comprise a bending assembly, a mandrel, micro-bend in the fiber, an acousto-optic transducer, a thermal device, a fiber stretcher, or a piezo-electric device, or any combination thereof. The first length of fiber and the second length of fiber may be separate passive fibers that are spliced together.

Systems disclosed herein may include, an optical beam delivery system, comprising an optical fiber including a first and second length of fiber and an optical system coupled to the second length of fiber including one or more free-space optics configured to receive and transmit an optical beam comprising modified beam characteristics. The first length of fiber may include a first RIP formed to enable, at least in part, modification of one or more beam characteristics of an optical beam by a perturbation assembly arranged to modify the one or more beam characteristics, the perturbation assembly may be coupled to the first length of fiber or integral with the first length of fiber, or a combination thereof. The second length of fiber may be coupled to the first length of fiber and may include a second RIP formed to preserve at least a portion of the one or more beam characteristics of the optical beam modified by the perturbation assembly within one or more first confinement regions. In some examples, the first RIP and the second RIP are different.

The optical beam delivery system may further include a first process fiber coupled between a first process head and the optical system, wherein the first process fiber is configured to receive the optical beam comprising the modified one or more beam characteristics. The first process fiber may comprise a third RIP configured to preserve at least a portion of the modified one or more beam characteristics of the optical beam within one or more second confinement regions of the first process fiber. In an example, at least a portion of the free-space optics may be configured to further modify the modified one or more beam characteristics of the optical beam. The one or more beam characteristics may include beam diameter, divergence distribution, BPP, intensity distribution, luminance, $M^2$ value, NA, optical intensity, power density, radial beam position, radiance, or spot size, or any combination thereof. The third RIP may be the same as or different from the second RIP. The third RIP may be configured to further modify the modified one or more beam characteristics of the optical beam. In some examples, at least one of the one or more second confinement regions includes at least one divergence structure configured to modify a divergence profile of the optical beam. The divergence structure may comprise an area of lower-index material than that of the second confinement region.

The optical beam delivery system may further include a second process fiber having a fourth RIP that is coupled between the optical system and a second process head, wherein the second process fiber may be configured to receive the optical beam comprising the modified one or more beam characteristics within one or more second confinement regions of the second process fiber. In some examples, the first process fiber or the second process fiber or a combination thereof may be configured to further modify the modified one or more beam characteristics of the optical beam. The second process fiber may include at least one divergence structure configured to modify a divergence profile of the optical beam. The second process fiber may comprise a central core surrounded by at least one of the one or more second confinement regions, wherein the core and the second confinement region are separated by a cladding structure having a first index of refraction that is lower than a second index of refraction of the central core and a third index of refraction of the second confinement region, wherein the second confinement region may include the at least one divergence structure. The at least one divergence structure may comprise an area of lower-index material than that of the second confinement region. In an example, the second RIP may be different from the third RIP or the fourth RIP or a combination thereof. Alternatively, the second RIP may be the same as the third RIP or the fourth RIP or a combination thereof. The one or more beam characteristics that may be modified can include beam diameter, divergence distribution, BPP, intensity distribution, luminance, $M^2$ value, NA, optical intensity, power density, radial beam position, radiance, or spot size, or any combination thereof.

In some examples, at least a portion of the free-space optics may be configured to further modify the modified one or more beam characteristics of the optical beam. The first process fiber may be coupled between a first process head and the optical system, wherein the first process fiber is configured to receive the optical beam comprising twice modified one or more beam characteristics. The first process fiber may have a third RIP configured to preserve at least a portion of the twice modified one or more beam characteristics of the optical beam within one or more second confinement regions of the first process fiber. The third RIP may be different from the second RIP, wherein the third RIP is configured to further modify the twice modified one or more beam characteristics of the optical beam.

In some examples, the first process fiber may include a divergence structure configured to further modify the twice modified one or more beam characteristics of the optical beam. In some examples, a second process fiber may be coupled between the optical system and a second process head, wherein the second process fiber is configured to receive the twice modified one or more beam characteristics.

In some examples, the first process fiber or the second process fiber or a combination thereof is configured to further modify the twice modified one or more beam characteristics of the optical beam. The first process fiber or the second process fiber or a combination thereof may include at least one divergence structure configured to further modify the twice modified one or more beam characteristics of the optical beam. The optical system may be a fiber-to-fiber coupler, a fiber-to-fiber switch or a process head, or the like or a combination thereof.

The present disclosure is further directed to a method for forming an article. The method comprises: providing a material comprising a first material property; forming a melt pool by exposing the material to an optical beam comprising at least one beam characteristic, wherein the melt pool comprises at least one melt pool property determinative of a second material property of the material; and modifying the at least one beam characteristic in response to a change in the melt pool property.

The present disclosure is further directed to an optical beam system. The optical beam system comprises: an optical beam delivery device, comprising a first length of fiber having a first refractive-index profile (RIP), a second length coupled to the first length of fiber and having a second RIP and one or more confinement regions, and a perturbation device configured to modify one or more beam characteristics of an optical beam in one or more of the first length of fiber and in the second length of fiber, or in the first and second lengths of fiber, wherein the first RIP differs from the second RIP and wherein the second RIP is configured to confine at least a portion of the modified one or more beam characteristics of the optical beam within the one or more confinement regions of the second length of fiber.

The present disclosure may be directed to an additive manufacturing system for fabricating an article. The additive manufacturing system may include a substrate and a layering device configured to fabricate a first layer of the article on the substrate. The layering device may include an optical beam source configured to generate an optical beam and a variable beam characteristics (VBC) fiber operably coupled with the optical beam source and configured to modify one or more beam characteristics, such as a wavelength, of the optical beam.

In some examples, the VBC fiber may include a first length of fiber operably coupled with the optical beam source, and a second length of fiber operably coupled with the first length of fiber. The first length of fiber may be configured to receive the optical beam from the optical beam source and the second length of fiber may be configured to receive a modified optical beam from the first length of fiber. In some examples, the VBC fiber may further include a perturbation device operably coupled with the first length of fiber or the second length of fiber. The perturbation device may be configured to modify the optical beam traversing through the first length of fiber to generate the modified optical beam.

In some examples, the first length of fiber may include a first refractive index profile configured to modify the one or more beam characteristics, such as a wavelength, of the optical beam to generate the modified optical beam. In some examples, the second length of fiber may include a second refractive index profile and one or more confinement regions, and the second length of fiber may be configured to confine the modified optical beam to one of the confinement regions. In some examples, the refractive index profile of the first length of fiber and the second length of fiber may be different. In other examples, the refractive index profile of the first length of fiber and the second length of fiber may be the same.

In some examples, the layering device may further include a fabrication assembly. The fabrication assembly may include a feedstock container configured to contain a powdered feedstock, and an article support disposed in the feedstock container and configured to carry the article. In some examples, the layering device may further include a powder assembly. The powder assembly may include a powder chamber configured to contain the powdered feedstock, and a delivery support disposed in the powder chamber and configured to support the powdered feedstock. In some examples, the fabrication assembly may further include a roller configured to transfer a portion of the powdered feedstock from the powder assembly to the fabrication assembly. In some examples, the additive manufacturing system may include a scanner operably coupled with the VBC fiber and configured to receive the optical beam therefrom and direct the optical beam to the powdered feedstock disposed in the feedstock container.

In some examples, the layering device may further include a fabrication assembly. The fabrication assembly may include a deposition nozzle operably coupled with the VBC fiber and configured to deliver a powdered feedstock to the substrate. In some examples, the fabrication assembly may further include a powder feeder operably coupled with the deposition nozzle via a conduit. The powder feeder may be configured to contain the powdered feedstock and deliver the powdered feedstock to the deposition nozzle.

In some examples, the layering device may be configured to fabricate the first layer of the article on the substrate from a powdered feedstock. In other examples, the layering device is configured to fabricate the first layer of the article on the substrate from a liquid feedstock. In some examples, the liquid feedstock includes a liquid photosensitive material.

In some examples, the additive manufacturing system may further include a computer aided design assembly configured to provide a digital model of the article to the layering device.

The present disclosure may also be directed to a method for fabricating an article. The method may include forming a first layer of the article on a substrate with an optical beam source and a variable beam characteristics (VBC) fiber operably coupled with the optical beam source. The VBC fiber may be configured to modify one or more beam characteristics of an optical beam from the optical beam source. The method may also include forming a second layer of the article adjacent the first layer of the article, and coupling the first layer of the article with the second layer of the article.

In some examples, forming the first layer of the article on the substrate may include modifying one or more beam characteristics of the optical beam in a first length of fiber of the VBC fiber with a perturbation device operably coupled therewith to provide a modified optical beam. In some examples, forming the first layer of the article on the substrate may further include confining the modified optical beam in a second length of fiber of the VBC fiber. In some examples, modifying one or more beam characteristics of the optical beam in the first length of fiber with the perturbation device includes bending the first length of fiber to modify a bend radius or a length of a bent region of the first length of fiber.

In some examples, forming the first layer of the article on the substrate may include modifying a wavelength of the optical beam from the optical beam source to produce a modified optical beam having a first wavelength in a first length of fiber of the VBC fiber. Forming the first layer of the article on the substrate may also include depositing a first material to form at least a portion of the first layer of the article on the substrate with the modified optical beam. In some examples, forming the first layer of the article may further include modifying a wavelength of the optical beam from the optical beam source to produce a second modified optical beam having a second wavelength in the first length of fiber of the VBC fiber, and depositing a second material to form at least a portion of the first layer on the article on the substrate with the second modified optical beam. In at least one example, the first wavelength and the second wavelength may be selected based on an expected interaction with the first material and the second material, respectively.

In some examples, forming the first layer of the article on the substrate may include modifying a wavelength of the optical beam from the optical beam source to produce a modified optical beam having a first wavelength in a first length of fiber of the VBC fiber. Forming the first layer of the article on the substrate may also include depositing a first material to form at least a portion of the first layer of the article on the substrate with the modified optical beam. In some examples, forming a second layer of the article adjacent the first layer of the article may include modifying a wavelength of the optical beam from the optical beam source to produce a second modified optical beam having a second wavelength in the first length of fiber of the VBC fiber, and depositing a second material to form at least a portion of the second layer of the article adjacent the first layer of the article. In at least one example, the first wavelength and the second wavelength may be selected based on an expected interaction with the first material and the second material, respectively.

BRIEF DESCRIPTION OF THE DRAWINGS

The accompanying drawings, wherein like reference numerals represent like elements, are incorporated in and constitute a part of this specification and, together with the description, explain the advantages and principles of the presently disclosed technology. In the drawings.

FIG. 29A illustrates an exemplary laser system including a fiber assembly configured to provide variable beam characteristics and/or variable wavelengths disposed between an optical beam source and a process head;

FIG. 29B illustrates a cross-sectional view of an exemplary fiber assembly for the laser system of FIG. 29A;

DETAILED DESCRIPTION

Figure 1:
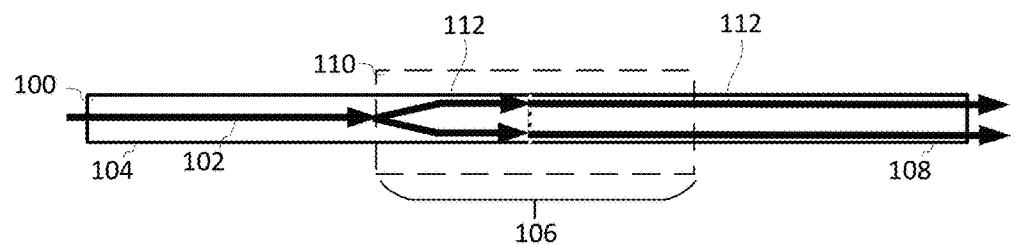
FIG. 1 illustrates an example fiber structure for providing a laser beam having variable beam characteristics.

As used herein throughout this disclosure and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. Also, the terms "modify" and "adjust" are used interchangeably to mean "alter."

The systems, apparatus, and methods described herein should not be construed as limiting in any way. Instead, the present disclosure is directed toward all novel and nonobvious features and aspects of the various disclosed embodiments, alone and in various combinations and subcombinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as "lowest", "best", "minimum," or the like. It will be appreciated that such descriptions are intended to indicate that a selection among many used functional alternatives can be made, and such selections need not be better, smaller, or otherwise preferable to other selections. Examples are described with reference to directions indicated as "above," "below," "upper," "lower," and the like. These terms are used for convenient description, but do not imply any particular spatial orientation.

Definitions

Definitions of words and terms as used herein:

1. The term "beam characteristics" refers to one or more of the following terms used to describe an optical beam. In general, the beam characteristics of most interest depend on the specifics of the application or optical system.
2. The term "wavelength" shall have its plain meaning as understood by one of ordinary skill in the art.
3. The term "beam diameter" is defined as the distance across the center of the beam along an axis for which the irradiance (intensity) equals $1/e^2$ of the maximum irradiance. While examples disclosed herein generally use beams that propagate in azimuthally symmetric modes, elliptical or other beam shapes can be used, and beam diameter can be different along different axes. Circular beams are characterized by a single beam diameter. Other beam shapes can have different beam diameters along different axes.
4. The term "spot size" is the radial distance (radius) from the center point of maximum irradiance to the $1/e^2$ point.
5. The term "beam divergence distribution" is the power vs the full cone angle. This quantity is sometimes called the "angular distribution" or "NA distribution."
6. The term "beam parameter product" (BPP) of a laser beam is defined as the product of the beam radius (measured at the beam waist) and the beam divergence half-angle (measured in the far field). The units of BPP are typically mm-mrad.
7. A "confinement fiber" is defined to be a fiber that possesses one or more confinement regions, wherein a confinement region comprises a higher-index region (core region) surrounded by a lower-index region (cladding region). The RIP of a confinement fiber may include one or more higher-index regions (core regions) surrounded by lower-index regions (cladding regions), wherein light is guided in the higher-index regions. Each confinement region and each cladding region can have any RIP, including but not limited to step-index and graded-index. The confinement regions may or may not be concentric and may be a variety of shapes such as circular, annular, polygonal, arcuate, elliptical, or irregular, or the like or any combination thereof. The confinement regions in a particular confinement fiber may all have the same shape or may be different shapes. Moreover, confinement regions may be co-axial or may have offset axes with respect to one another. Confinement regions may be of uniform thickness about a central axis in the longitudinal direction, or the thicknesses may vary about the central axis in the longitudinal direction.

8. The term "intensity distribution" refers to optical intensity as a function of position along a line (1D profile) or on a plane (2D profile). The line or plane is usually taken perpendicular to the propagation direction of the light. It is a quantitative property.

9. "Luminance" is a photometric measure of the luminous intensity per unit area of light travelling in a given direction.

10. "$M^2$ factor" (also called "beam quality factor" or "beam propagation factor") is a dimensionless parameter for quantifying the beam quality of laser beams, with $M^2=1$ being a diffraction-limited beam, and larger M2 values corresponding to lower beam quality. $M^2$ is equal to the BPP divided by $\lambda/\pi$, where $\lambda$ is the wavelength of the beam in microns (if BPP is expressed in units of mm-mrad).

11. The term "numerical aperture" or "NA" of an optical system is a dimensionless number that characterizes the range of angles over which the system can accept or emit light.

12. The term "optical intensity" is not an official (SI) unit, but is used to denote incident power per unit area on a surface or passing through a plane.

13. The term "power density" refers to optical power per unit area, although this is also referred to as "optical intensity."

14. The term "radial beam position" refers to the position of a beam in a fiber measured with respect to the center of the fiber core in a direction perpendicular to the fiber axis.

15. "Radiance" is the radiation emitted per unit solid angle in a given direction by a unit area of an optical source (e.g., a laser). Radiance may be altered by changing the beam intensity distribution and/or beam divergence profile or distribution. The ability to vary the power density (also referred to as the radiance profile) of a laser beam implies the ability to vary the BPP.

16. The term "refractive-index profile" or "RIP" refers to the refractive index as a function of position along a line (1D) or in a plane (2D) perpendicular to the fiber axis. Many fibers are azimuthally symmetric, in which case the 1D RIP is identical for any azimuthal angle.

17. A "step-index fiber" has a RIP that is flat (refractive index independent of position) within the fiber core.

18. A "graded-index fiber" has a RIP in which the refractive index decreases with increasing radial position (i.e., with increasing distance from the center of the fiber core).

19. A "parabolic-index fiber" is a specific case of a graded-index fiber in which the refractive index decreases quadratically with increasing distance from the center of the fiber core.

Fiber for Varying Beam Characteristics

Disclosed herein are methods, systems, and apparatus configured to provide a fiber operable to provide a laser beam having variable beam characteristics (VBC) that may reduce cost, complexity, optical loss, or other drawbacks of the conventional methods described above. This VBC fiber is configured to vary a wide variety of optical beam characteristics. Such beam characteristics can be controlled using the VBC fiber thus allowing users to tune various beam characteristics to suit the particular requirements of an extensive variety of laser processing applications. For example, a VBC fiber may be used to tune: beam diameter, beam divergence distribution, BPP, intensity distribution, $M^2$ factor, NA, optical intensity, power density, radial beam position, radiance, spot size, wavelength or the like, or any combination thereof.

In general, the disclosed technology entails coupling a laser beam into a fiber in which the characteristics of the laser beam in the fiber can be adjusted by perturbing the laser beam and/or perturbing a first length of fiber by any of a variety of methods (e.g., bending the fiber or introducing one or more other perturbations) and fully or partially maintaining adjusted beam characteristics in a second length of fiber. The second length of fiber is specially configured to maintain and/or further modify the adjusted beam characteristics. In some cases, the second length of fiber preserves the adjusted beam characteristics through delivery of the laser beam to its ultimate use (e.g., materials processing). The first and second lengths of fiber may comprise the same or different fibers.

The disclosed technology is compatible with fiber lasers and fiber-coupled lasers. Fiber-coupled lasers typically deliver an output via a delivery fiber having a step-index refractive index profile (RIP), i.e., a flat or constant refractive index within the fiber core. In reality, the RIP of the delivery fiber may not be perfectly flat, depending on the design of the fiber. Important parameters are the fiber core diameter (dcore) and NA. The core diameter is typically in the range of 10-1000 micron (although other values are possible), and the NA is typically in the range of 0.06-0.22 (although other values are possible). A delivery fiber from the laser may be routed directly to the process head or work piece, or it may be routed to a fiber-to-fiber coupler (FFC) or fiber-to-fiber switch (FFS), which couples the light from the delivery fiber into a process fiber that transmits the beam to the process head or the work piece.

Most materials processing tools, especially those at high power (>1 kW), employ multimode (MM) fiber, but some employ single-mode (SM) fiber, which is at the lower end of the dcore and NA ranges. The beam characteristics from a SM fiber are uniquely determined by the fiber parameters. The beam characteristics from a MM fiber, however, can vary (unit-to-unit and/or as a function of laser power and time), depending on the beam characteristics from the laser source(s) coupled into the fiber, the launching or splicing conditions into the fiber, the fiber RIP, and the static and dynamic geometry of the fiber (bending, coiling, motion, micro-bending, etc.). For both SM and MM delivery fibers, the beam characteristics may not be optimum for a given materials processing task, and it is unlikely to be optimum for a range of tasks, motivating the desire to be able to systematically vary the beam characteristics in order to customize or optimize them for a particular processing task.

In one example, the VBC fiber may have a first length and a second length and may be configured to be interposed as an in-fiber device between the delivery fiber and the process head to provide the desired adjustability of the beam characteristics. To enable adjustment of the beam, a perturbation device and/or assembly is disposed in close proximity to and/or coupled with the VBC fiber and is responsible for perturbing the beam in a first length such that the beam's characteristics are altered in the first length of fiber, and the altered characteristics are preserved or further altered as the beam propagates in the second length of fiber. The perturbed beam is launched into a second length of the VBC fiber configured to conserve adjusted beam characteristics. The first and second lengths of fiber may be the same or different fibers and/or the second length of fiber may comprise a confinement fiber. The beam characteristics that are conserved by the second length of VBC fiber may include any of: beam diameter, beam divergence distribution, BPP, intensity distribution, luminance, $M^2$ factor, NA, optical intensity, power density, radial beam position, radiance, spot size, or the like, or any combination thereof.

FIG. 1 illustrates an example VBC fiber 100 for providing a laser beam having variable beam characteristics without requiring the use of free-space optics to change the beam characteristics. VBC fiber 100 comprises a first length of fiber 104 and a second length of fiber 108. First length of fiber 104 and second length of fiber 108 may be the same or different fibers and may have the same or different RIPs. The first length of fiber 104 and the second length of fiber 108 may be joined together by a splice. First length of fiber 104 and second length of fiber 108 may be coupled in other ways, may be spaced apart, or may be connected via an interposing component such as another length of fiber, free-space optics, glue, index-matching material, or the like or any combination thereof.

A perturbation device 110 is disposed proximal to and/or envelops perturbation region 106. Perturbation device 110 may be a device, assembly, in-fiber structure, and/or other feature. Perturbation device 110 at least perturbs optical beam 102 in first length of fiber 104 or second length of fiber 108 or a combination thereof in order to adjust one or more beam characteristics of optical beam 102. Adjustment of beam 102 responsive to perturbation by perturbation device 110 may occur in first length of fiber 104 or second length of fiber 108 or a combination thereof. Perturbation region 106 may extend over various widths and may or may not extend into a portion of second length of fiber 108. As beam 102 propagates in VBC fiber 100, perturbation device 110 may physically act on VBC fiber 100 to perturb the fiber and adjust the characteristics of beam 102. Alternatively, perturbation device 110 may act directly on beam 102 to alter its beam characteristics. Subsequent to being adjusted, perturbed beam 112 has different beam characteristics than beam 102, which will be fully or partially conserved in second length of fiber 108. In another example, perturbation device 110 need not be disposed near a splice. Moreover, a splice may not be needed at all, for example VBC fiber 100 may be a single fiber, first length of fiber and second length of fiber could be spaced apart, or secured with a small gap (air-spaced or filled with an optical material, such as optical cement or an index-matching material).

Perturbed beam 112 is launched into second length of fiber 108, where perturbed beam 112 characteristics are largely maintained or continue to evolve as perturbed beam 112 propagates yielding the adjusted beam characteristics at the output of second length of fiber 108. In one example, the new beam characteristics may include an adjusted intensity distribution. In an example, an altered beam intensity distribution will be conserved in various structurally bounded confinement regions of second length of fiber 108. Thus, the beam intensity distribution may be tuned to a desired beam intensity distribution optimized for a particular laser processing task. In general, the intensity distribution of perturbed beam 112 will evolve as it propagates in the second length of fiber 108 to fill the confinement region(s) into which perturbed beam 112 is launched responsive to conditions in first length of fiber 104 and perturbation caused by perturbation device 110. In addition, the angular distribution may evolve as the beam propagates in the second fiber, depending on launch conditions and fiber characteristics. In general, fibers largely preserve the input divergence distribution, but the distribution can be broadened if the input divergence distribution is narrow and/or if the fiber has irregularities or deliberate features that perturb the divergence distribution. The various confinement regions, perturbations, and fiber features of second length of fiber 108 are described in greater detail below. Beams 102 and 112 are conceptual abstractions intended to illustrate how a beam may propagate through a VBC fiber 100 for providing variable beam characteristics and are not intended to closely model the behavior of a particular optical beam.

VBC fiber 100 may be manufactured by a variety of methods including PCVD (Plasma Chemical Vapor Deposition), OVD (Outside Vapor Deposition), VAD (Vapor Axial Deposition), MOCVD (Metal-Organic Chemical Vapor Deposition.) and/or DND (Direct Nanoparticle Deposition). VBC fiber 100 may comprise a variety of materials. For example, VBC fiber 100 may comprise $SiO_2$, $SiO_2$ doped with $GeO_2$, germanosilicate, phosphorus pentoxide, phosphosilicate, $Al_2O_3$, aluminosilicate, or the like or any combinations thereof. Confinement regions may be bounded by cladding doped with fluorine, boron, or the like or any combinations thereof. Other dopants may be added to active fibers, including rare-earth ions such as $Er^{3+}$ (erbium), $Yb^{3+}$ (ytterbium), $Nd^{3+}$ (neodymium), $Tm^{3+}$ (thulium), $Ho^{3+}$ (holmium), or the like or any combination thereof. Confinement regions may be bounded by cladding having a lower index than the confinement region with fluorine or boron doping. Alternatively, VBC fiber 100 may comprise photonic crystal fibers or micro-structured fibers.

VBC fiber 100 is suitable for use in any of a variety of fiber, fiber optic, or fiber laser devices, including continuous wave and pulsed fiber lasers, disk lasers, solid state lasers, or diode lasers (pulse rate unlimited except by physical constraints). Furthermore, implementations in a planar waveguide or other types of waveguides and not just fibers are within the scope of the claimed technology.

Figure 2:
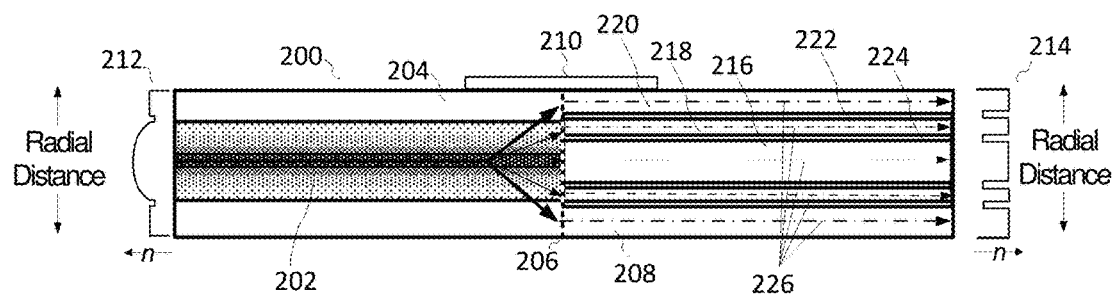
FIG. 2 depicts a cross-sectional view of an example fiber structure for delivering a beam with variable beam characteristics.

FIG. 2 depicts a cross-sectional view of an example VBC fiber 200 for adjusting beam characteristics of an optical beam. In an example, VBC fiber 200 may be a process fiber because it may deliver the beam to a process head for material processing. VBC fiber 200 comprises a first length of fiber 204 spliced at junction 206 to a second length of fiber 208. A perturbation assembly 210 is disposed proximal to junction 206. Perturbation assembly 210 may be any of a variety of devices configured to enable adjustment of the beam characteristics of an optical beam 202 propagating in VBC fiber 200. In an example, perturbation assembly 210 may be a mandrel and/or another device that may provide means of varying the bend radius and/or bend length of VBC fiber 200 near the splice. Other examples of perturbation devices are discussed below with respect to FIG. 24.

In an example, first length of fiber 204 has a parabolic-index RIP 212 as indicated by the left RIP graph. Most of the intensity distribution of beam 202 is concentrated in the center of fiber 204 when fiber 204 is straight or nearly straight. Second length of fiber 208 is a confinement fiber having RIP 214 as shown in the right RIP graph. Second length of fiber 208 includes confinement regions 216, 218 and 220. Confinement region 216 is a central core surrounded by two annular (or ring-shaped) confinement regions 218 and 220. Layers 222 and 224 are structural barriers of lower index material between confinement regions (216, 218 and 220), commonly referred to as "cladding" regions. In one example, layers 222 and 224 may comprise rings of fluorosilicate; in some embodiments, the fluorosilicate cladding layers are relatively thin. Other materials may be used as well and claimed subject matter is not limited in this regard.

In an example, as beam 202 propagates along VBC fiber 200, perturbation assembly 210 may physically act on fiber 208 and/or beam 202 to adjust its beam characteristics and generate adjusted beam 226. In the current example, the intensity distribution of beam 202 is modified by perturbation assembly 210. Subsequent to adjustment of beam 202 the intensity distribution of adjusted beam 226 may be concentrated in outer confinement regions 218 and 220 with relatively little intensity in the central confinement region 216. Because each of confinement regions 216, 218, and/or 220 is isolated by the thin layers of lower index material in barrier layers 222 and 224, second length of fiber 208 can substantially maintain the adjusted intensity distribution of adjusted beam 226. The beam will typically become distributed azimuthally within a given confinement region but will not transition (significantly) between the confinement regions as it propagates along the second length of fiber 208. Thus, the adjusted beam characteristics of adjusted beam 226 are largely conserved within the isolated confinement regions 216, 218, and/or 220. In some cases, it be may desirable to have the beam 226 power divided among the confinement regions 216, 218, and/or 220 rather than concentrated in a single region, and this condition may be achieved by generating an appropriately adjusted beam 226.

In one example, core confinement region 216 and annular confinement regions 218 and 220 may be composed of fused silica glass, and cladding 222 and 224 defining the confinement regions may be composed of fluorosilicate glass. Other materials may be used to form the various confinement regions (216, 218 and 220), including germanosilicate, phosphosilicate, aluminosilicate, or the like, or a combination thereof and claimed subject matter is not so limited. Other materials may be used to form the barrier rings (222 and 224), including fused silica, borosilicate, or the like or a combination thereof, and claimed subject matter is not so limited. In other embodiments, the optical fibers or waveguides include or are composed of various polymers or plastics or crystalline materials. Generally, the core confinement regions have refractive indices that are greater than the refractive indices of adjacent barrier/cladding regions.

In some examples, it may be desirable to increase a number of confinement regions in a second length of fiber to increase granularity of beam control over beam displacements for fine-tuning a beam profile. For example, confinement regions may be configured to provide stepwise beam displacement.

Figure 3:
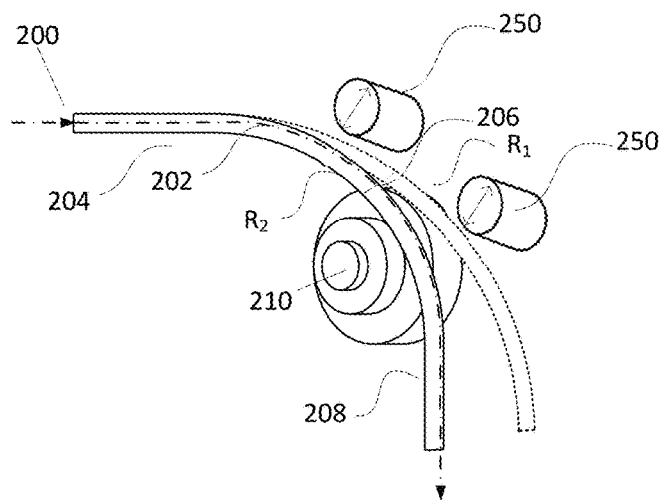
FIG. 3 illustrates an example method of perturbing a fiber structure for providing a beam having variable beam characteristics.

FIG. 3 illustrates an example method of perturbing fiber 200 for providing variable beam characteristics of an optical beam. Changing the bend radius of a fiber may change the radial beam position, divergence angle, and/or radiance profile of a beam within the fiber. The bend radius of VBC fiber 200 can be decreased from a first bend radius $R_1$ to a second bend radius $R_2$ about splice junction 206 by using a stepped mandrel or cone as the perturbation assembly 210. Additionally or alternatively, the engagement length on the mandrel(s) or cone can be varied. Rollers 250 may be employed to engage VBC fiber 200 across perturbation assembly 210. In an example, an amount of engagement of rollers 250 with fiber 200 has been shown to shift the distribution of the intensity profile to the outer confinement regions 218 and 220 of fiber 200 with a fixed mandrel radius. There are a variety of other methods for varying the bend radius of fiber 200, such as using a clamping assembly, flexible tubing, or the like, or a combination thereof, and claimed subject matter is not limited in this regard. In another example, for a particular bend radius the length over which VBC fiber 200 is bent can also vary beam characteristics in a controlled and reproducible way. In examples, changing the bend radius and/or length over which the fiber is bent at a particular bend radius also modifies the intensity distribution of the beam such that one or more modes may be shifted radially away from the center of a fiber core.

Maintaining the bend radius of the fibers across junction 206 ensures that the adjusted beam characteristics such as radial beam position and radiance profile of optical beam 202 will not return to beam 202's unperturbed state before being launched into second length of fiber 208. Moreover, the adjusted radial beam characteristics, including position, divergence angle, and/or intensity distribution, of adjusted beam 226 can be varied based on an extent of decrease in the bend radius and/or the extent of the bent length of VBC fiber 200. Thus, specific beam characteristics may be obtained using this method.

In the current example, first length of fiber 204 having first RIP 212 is spliced at junction 206 to a second length of fiber 208 having a second RIP 214. However, it is possible to use a single fiber having a single RIP formed to enable perturbation (e.g., by micro-bending) of the beam characteristics of beam 202 and also to enable conservation of the adjusted beam. Such a RIP may be similar to the RIPs shown in fibers illustrated in FIGS. 17, 18, and/or 19.

Figure 4:
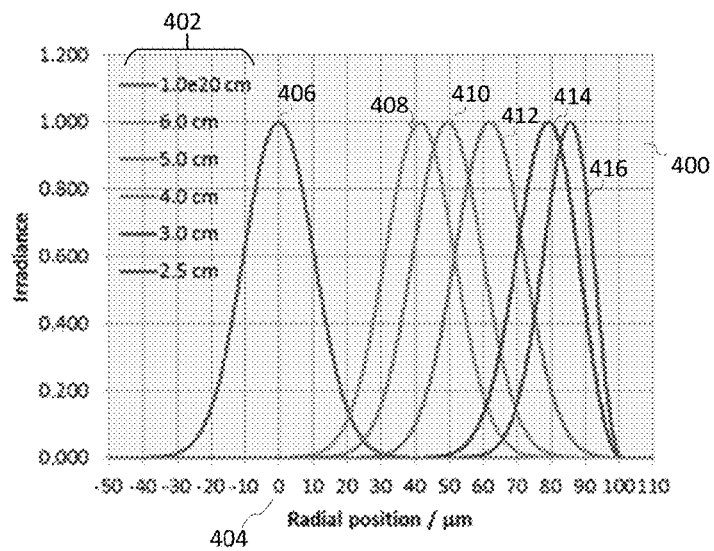
FIG. 4 is a graph illustrating the calculated spatial profile of the lowest-order mode (LPoi) for a first length of a fiber for different fiber bend radii.
Figure 5:
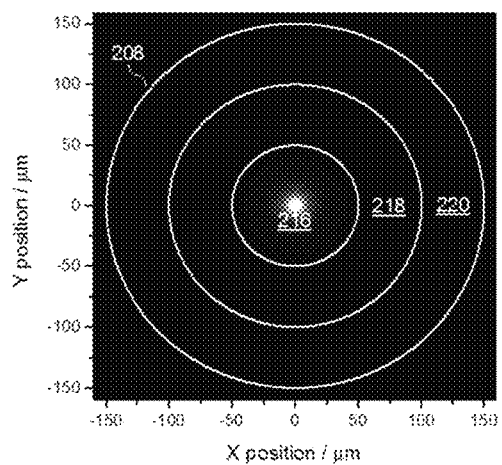
FIG. 5 illustrates an example of a two-dimensional intensity distribution at a junction when a fiber for varying beam characteristics is nearly straight.
Figure 6:
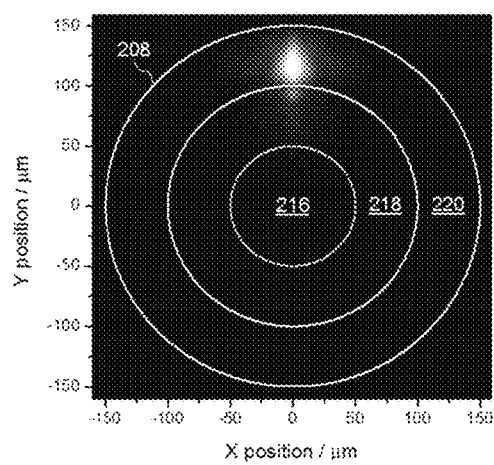
FIG. 6 illustrates an example of a two-dimensional intensity distribution at a junction when a fiber for varying beam characteristics is bent with a radius chosen to preferentially excite a particular confinement region of a second length of fiber.

FIGS. 7-10 provide experimental results for VBC fiber 200 (shown in FIGS. 2 and 3) and illustrate further a beam response to perturbation of VBC fiber 200 when a perturbation assembly 210 acts on VBC fiber 200 to bend the fiber. FIGS. 4-6 are simulations and FIGS. 7-10 are experimental results wherein a beam from a SM 1050 nm source was launched into an input fiber (not shown) with a 40 micron core diameter. The input fiber was spliced to first length of fiber 204.

FIG. 4 is an example graph 400 illustrating the calculated profile of the lowest-order mode ($LP_{01}$) for a first length of fiber 204 for different fiber bend radii 402, wherein a perturbation assembly 210 involves bending VBC fiber 200. As the fiber bend radius is decreased, an optical beam propagating in VBC fiber 200 is adjusted such that the mode shifts radially away from the center 404 of a VBC fiber 200 core (r=0 micron) toward the core/cladding interface (located at r=100 micron in this example). Higher-order modes ($LP_{ln}$) also shift with bending. Thus, a straight or nearly straight fiber (very large bend radius), curve 406 for $LP_{01}$ is centered at or near the center 404 of VBC fiber 200. At a bend radius of about 6 cm, curve 408 for $LP_{01}$ is shifted to a radial position of about 40 μm from the center 406 of VBC fiber 200. At a bend radius of about 5 cm, curve 410 for $LP_{01}$ is shifted to a radial position about 50 μm from the center 404 of VBC fiber 200. At a bend radius of about 4 cm, curve 412 for $LP_{01}$ is shifted to a radial position about 60 μm from the center 404 of VBC fiber 200. At a bend radius of about 3 cm, curve 414 for $LP_{01}$ is shifted to a radial position about 80 μm from the center 404 of VBC fiber 200. At a bend radius of about 2.5 cm, a curve 416 for $LP_{01}$ is shifted to a radial position about 85 μm from the center 404 of VBC fiber 200. Note that the shape of the mode remains relatively constant (until it approaches the edge of the core), which is a specific property of a parabolic RIP. Although, this property may be desirable in some situations, it is not required for the VBC functionality, and other RIPs may be employed.

In an example, if VBC fiber 200 is straightened, $LP_{01}$ mode will shift back toward the center of the fiber. Thus, the purpose of second length of fiber 208 is to "trap" or confine the adjusted intensity distribution of the beam in a confinement region that is displaced from the center of the VBC fiber 200. The splice between fibers 204 and 208 is included in the bent region, thus the shifted mode profile will be preferentially launched into one of the ring-shaped confinement regions 218 and 220 or be distributed among the confinement regions. FIGS. 5 and 6 illustrate this effect.

FIG. 5 illustrates an example two-dimensional intensity distribution at junction 206 within second length of fiber 208 when VBC fiber 200 is nearly straight. A significant portion of $LP_{01}$ and $LP_{In}$ are within confinement region 216 of fiber 208. FIG. 6 illustrates the two-dimensional intensity distribution at junction 206 within second length of fiber 208 when VBC fiber 200 is bent with a radius chosen to preferentially excite confinement region 220 (the outermost confinement region) of second length of fiber 208. A significant portion of $LP_{01}$ and $LP_{In}$ are within confinement region 220 of fiber 208.

In an example, second length of fiber 208 confinement region 216 has a 100 micron diameter, confinement region 218 is between 120 micron and 200 micron in diameter, and confinement region 220 is between 220 micron and 300 micron diameter. Confinement regions 216, 218, and 220 are separated by 10 μm thick rings of fluorosilicate, providing an NA of 0.22 for the confinement regions. Other inner and outer diameters for the confinement regions, thicknesses of the rings separating the confinement regions, NA values for the confinement regions, and numbers of confinement regions may be employed.

Referring again to FIG. 5, with the noted parameters, when VBC fiber 200 is straight about 90% of the power is contained within the central confinement region 216, and about 100% of the power is contained within confinement regions 216 and 218. Referring now to FIG. 6, when fiber 200 is bent to preferentially excite second ring confinement region 220, nearly 75% of the power is contained within confinement region 220, and more than 95% of the power is contained within confinement regions 218 and 220. These calculations include $LP_{01}$ and two higher-order modes, which is typical in some 2-4 kW fiber lasers.

It is clear from FIGS. 5 and 6 that in the case where a perturbation assembly 210 acts on VBC fiber 200 to bend the fiber, the bend radius determines the spatial overlap of the modal intensity distribution of the first length of fiber 204 with the different guiding confinement regions (216, 218, and 220) of the second length of fiber 208. Changing the bend radius can thus change the intensity distribution at the output of the second length of fiber 208, thereby changing the diameter or spot size of the beam, and thus also changing its radiance and BPP value. This adjustment of the spot size may be accomplished in an all-fiber structure, involving no free-space optics and consequently may reduce or eliminate the disadvantages of free-space optics discussed above. Such adjustments can also be made with other perturbation assemblies that alter bend radius, bend length, fiber tension, temperature, or other perturbations discussed below.

In a typical materials processing system (e.g., a cutting or welding tool), the output of the process fiber is imaged at or near the work piece by the process head. Varying the intensity distribution as shown in FIGS. 5 and 6 thus enables variation of the beam profile at the work piece in order to tune and/or optimize the process, as desired. Specific RIPs for the two fibers were assumed for the purpose of the above calculations, but other RIPs are possible, and claimed subject matter is not limited in this regard.

FIGS. 7-10 depict experimental results (measured intensity distributions) to illustrate further output beams for various bend radii of VBC fiber 200 shown in FIG. 2.

Figure 7:
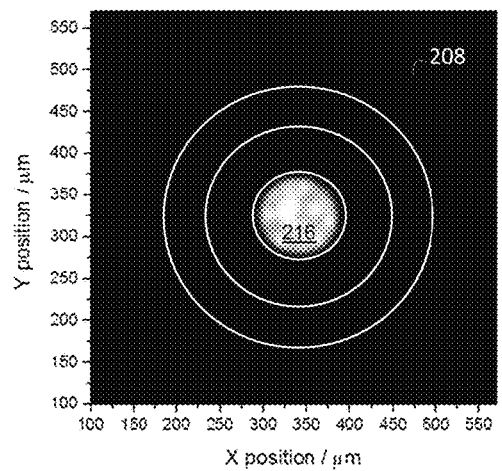
FIGS. 7-10 depict experimental results to illustrate further output beams for various bend radii of a fiber for varying beam characteristics shown in FIG. 2.
Figure 8:
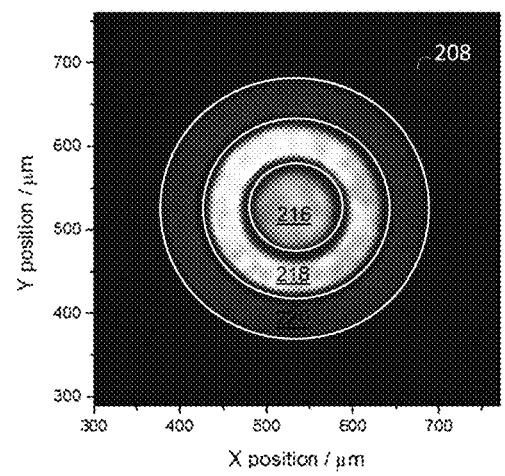
Figure 9:
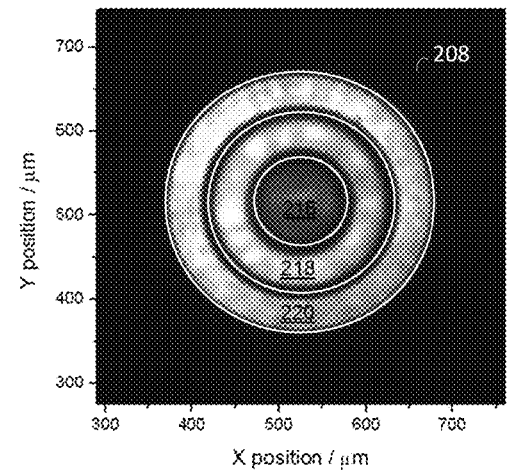
Figure 10:
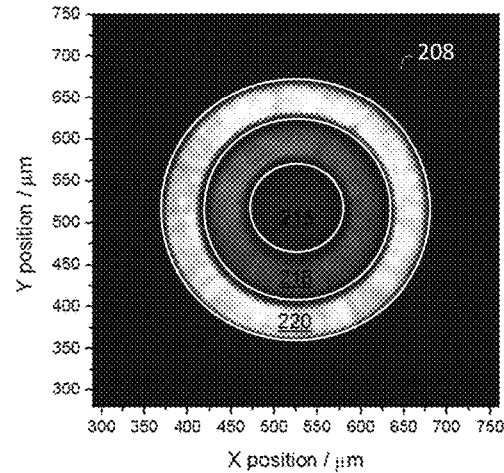

In FIG. 7 when VBC fiber 200 is straight, the beam is nearly completely confined to confinement region 216. As the bend radius is decreased, the intensity distribution shifts to higher diameters (FIGS. 8-10). FIG. 8 depicts the intensity distribution when the bend radius of VBC fiber 200 is chosen to shift the intensity distribution preferentially to confinement region 218. FIG. 9 depicts the experimental results when the bend radius is further reduced and chosen to shift the intensity distribution outward to confinement region 220 and confinement region 218. In FIG. 10, at the smallest bend radius, the beam is nearly a "donut mode", with most of the intensity in the outermost confinement region 220.

Despite excitation of the confinement regions from one side at the splice junction 206, the intensity distributions are nearly symmetric azimuthally because of scrambling within confinement regions as the beam propagates within the VBC fiber 200. Although the beam will typically scramble azimuthally as it propagates, various structures or perturbations (e.g., coils) could be included to facilitate this process.

For the fiber parameters used in the experiment shown in FIGS. 7-10, particular confinement regions were not exclusively excited because some intensity was present in multiple confinement regions. This feature may enable advantageous materials processing applications that are optimized by having a flatter or distributed beam intensity distribution. In applications requiring cleaner excitation of a given confinement region, different fiber RIPs could be employed to enable this feature.

The results shown in FIGS. 7-10 pertain to the particular fibers used in this experiment, and the details will vary depending on the specifics of the implementation. In particular, the spatial profile and divergence distribution of the output beam and their dependence on bend radius will depend on the specific RIPs employed, on the splice parameters, and on the characteristics of the laser source launched into the first fiber.

Different fiber parameters than those shown in FIG. 2 may be used and still be within the scope of the claimed subject matter. Specifically, different RIPs and core sizes and shapes may be used to facilitate compatibility with different input beam profiles and to enable different output beam characteristics. Example RIPs for the first length of fiber, in addition to the parabolic-index profile shown in FIG. 2, include other graded-index profiles, step-index, pedestal designs (i.e., nested cores with progressively lower refractive indices with increasing distance from the center of the fiber), and designs with nested cores with the same refractive index value but with various NA values for the central core and the surrounding rings. Example RIPs for the second length of fiber, in addition to the profile shown in FIG. 2, include confinement fibers with different numbers of confinement regions, non-uniform confinement-region thicknesses, different and/or non-uniform values for the thicknesses of the rings surrounding the confinement regions, different and/or non-uniform NA values for the confinement regions, different refractive-index values for the high-index and low-index portions of the RIP, non-circular confinement regions (such as elliptical, oval, polygonal, square, rectangular, or combinations thereof), as well as other designs as discussed in further detail with respect to FIGS. 26-28. Furthermore, VBC fiber 200 and other examples of a VBC fiber described herein are not restricted to use of two fibers. In some examples, implementation may include use of one fiber or more than two fibers. In some cases, the fiber(s) may not be axially uniform; for example, they could include fiber Bragg gratings or long-period gratings, or the diameter could vary along the length of the fiber. In addition, the fibers do not have to be azimuthally symmetric, e.g., the core(s) could have square or polygonal shapes. Various fiber coatings (buffers) may be employed, including high-index or index-matched coatings (which strip light at the glass-polymer interface) and low-index coatings (which guide light by total internal reflection at the glass-polymer interface). In some examples, multiple fiber coatings may be used on VBC fiber 200.

FIGS. 11-16 illustrate cross-sectional views of examples of first lengths of fiber for enabling adjustment of beam characteristics in a VBC fiber responsive to perturbation of an optical beam propagating in the first lengths of fiber. Some examples of beam characteristics that may be adjusted in the first length of fiber are: beam diameter, beam divergence distribution, BPP, intensity distribution, luminance, $M^2$ factor, NA, optical intensity profile, power density profile, radial beam position, radiance, spot size, or the like, or any combination thereof. The first lengths of fiber depicted in FIGS. 11-16 and described below are merely examples and do not provide an exhaustive recitation of the variety of first lengths of fiber that may be utilized to enable adjustment of beam characteristics in a VBC fiber assembly. Selection of materials, appropriate RIPs, and other variables for the first lengths of fiber illustrated in FIGS. 11-16 at least depend on a desired beam output. A wide variety of fiber variables are contemplated and are within the scope of the claimed subject matter. Thus, claimed subject matter is not limited by examples provided herein.

Figure 11:
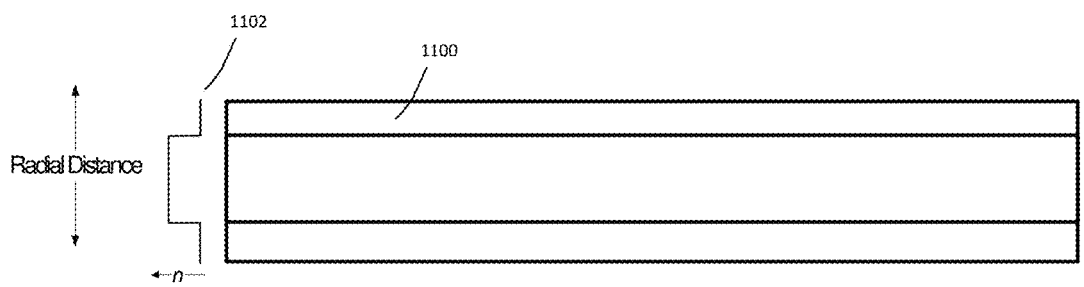
FIGS. 11-16 illustrate cross-sectional views of example first lengths of fiber for enabling adjustment of beam characteristics in a fiber assembly.
Figure 12:
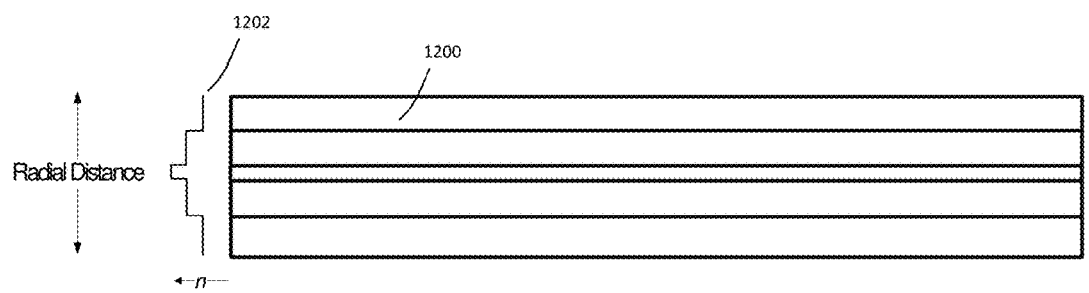
Figure 13:
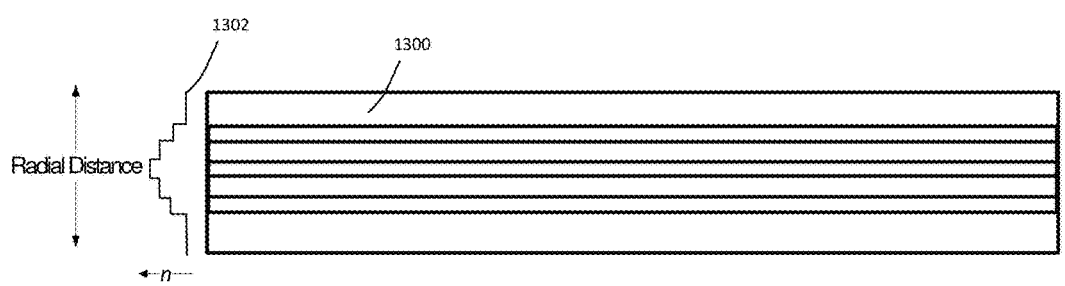

In FIG. 11 first length of fiber 1100 comprises a step-index profile 1102. FIG. 12 illustrates a first length of fiber 1200 comprising a "pedestal RIP" (i.e., a core comprising a step-index region surrounded by a larger step-index region) 1202. FIG. 13 illustrates first length of fiber 1300 comprising a multiple-pedestal RIP 1302.

Figure 14A:
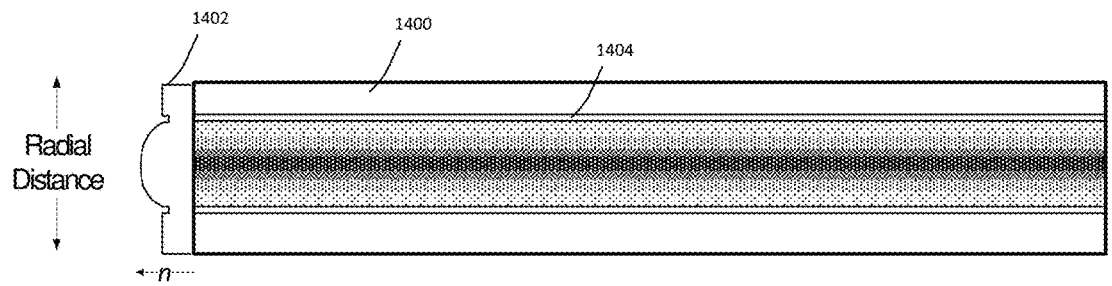

FIG. 14A illustrates first length of fiber 1400 comprising a graded-index profile 1418 surrounded by a down-doped region 1404. Fiber 1400 has a RIP 1402. When the fiber 1400 is perturbed, modes may shift radially outward in fiber 1400 (e.g., during bending of fiber 1400). Graded-index profile 1418 may be designed to promote maintenance or even compression of modal shape. This design may promote adjustment of a beam propagating in fiber 1400 to generate a beam having a beam intensity distribution concentrated in an outer perimeter of the fiber (i.e., in a portion of the fiber core that is displaced from the fiber axis). As described above, when the adjusted beam is coupled into a second length of fiber having confinement regions, the intensity distribution of the adjusted beam may be trapped in the outermost confinement region, providing a donut shaped intensity distribution. A beam spot having a narrow outer confinement region may be useful to enable certain material processing actions.

Figure 14B:
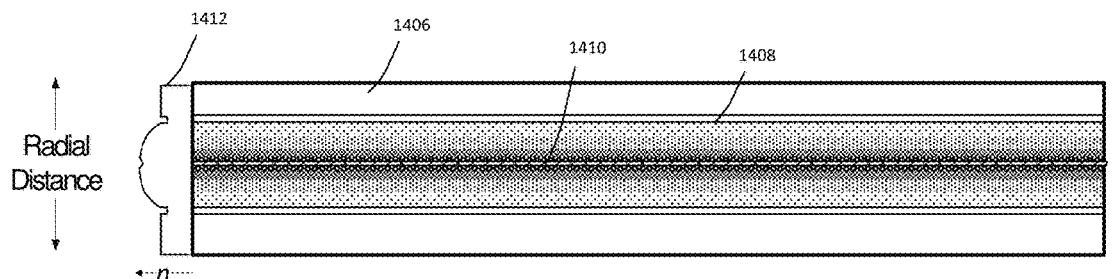

FIG. 14B illustrates first length of fiber 1406 comprising a graded-index profile 1414 surrounded by a down-doped region 1408 similar to fiber 1400. However, fiber 1406 includes a divergence structure 1410 (a lower-index region) as can be seen in RIP 1412. The divergence structure 1410 is an area of material with a lower refractive index than that of the surrounding core. As the beam is launched into first length of fiber 1406, refraction from divergence structure 1410 causes the beam divergence to increase in first length of fiber 1406. The amount of increased divergence depends on the amount of spatial overlap of the beam with the divergence structure 1410 and the magnitude of the index difference between the divergence structure 1410 and the core material. Divergence structure 1410 can have a variety of shapes, depending on the input divergence distribution and desired output divergence distribution. In an example, divergence structure 1410 has a triangular or graded index shape.

Figure 15:
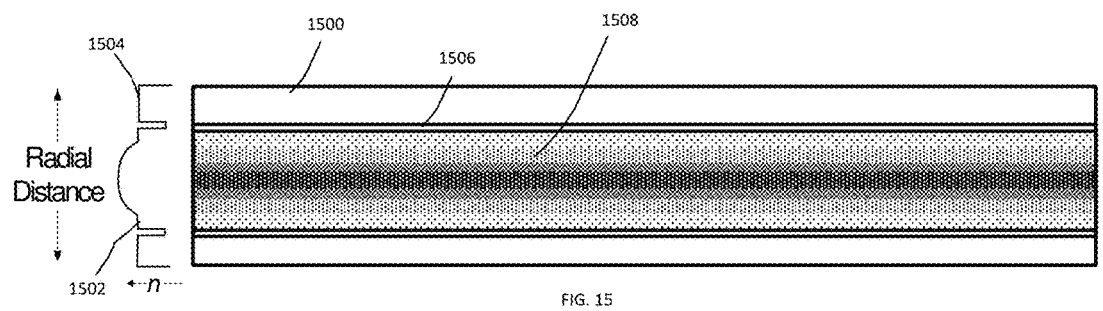

FIG. 15 illustrates a first length of fiber 1500 comprising a parabolic-index central region 1502 surrounded by a constant-index region 1504, and the constant-index region 1504 is surrounded by a lower-index annular layer 1506. The lower-index annular layer 1506 helps guide a beam propagating in fiber 1500. When the propagating beam is perturbed, modes shift radially outward in fiber 1500 (e.g., during bending of fiber 1500). As one or more modes shift radially outward, parabolic-index region 1502 promotes retention of modal shape. When the modes reach the constant-index region 1504 of the RIP 1510, they will be compressed against the low-index annular layer 1506, which may cause preferential excitation of the outermost confinement region in the second fiber (in comparison to the first fiber RIP shown in FIG. 14). In one implementation, this fiber design works with a confinement fiber having a central step-index core and a single annular core. The parabolic-index portion 1502 of the RIP overlaps with the central step-index core of the confinement fiber. The constant-index portion 1504 overlaps with the annular core of the confinement fiber. The constant-index portion 1504 of the first fiber is intended to make it easier to move the beam into overlap with the annular core by bending. This fiber design also works with other designs of the confinement fiber.

Figure 16:
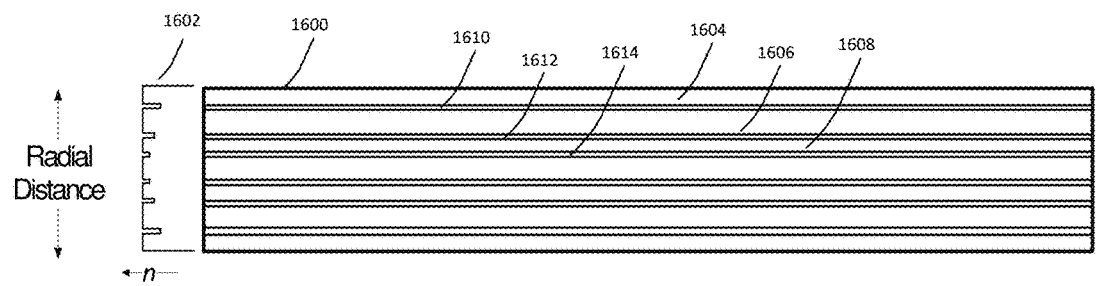

FIG. 16 illustrates a first length of fiber 1600 comprising guiding regions 1604, 1606, 1608, and 1616 bounded by lower-index layers 1610, 1612, and 1614 where the indexes of the lower-index layers 1610, 1612, and 1614 are stepped or, more generally, do not all have the same value as illustrated by RIP 1602. The lower-index layers may serve to bound the beam intensity to certain guiding regions (1604, 1606, 1608, and 1616) when the perturbation assembly 210 (see FIG. 2) acts on the fiber 1600. In this way, adjusted beam light may be trapped in the guiding regions over a range of perturbation actions (such as over a range of bend radii, a range of bend lengths, a range of micro-bending pressures, and/or a range of acousto-optical signals), allowing for a certain degree of perturbation tolerance before a beam intensity distribution is shifted to a more distant radial position in fiber 1600. Thus, variation in beam characteristics may be controlled in a step-wise fashion. The radial widths of the guiding regions 1604, 1606, 1608, and 1616 may be adjusted to achieve a desired ring width, as may be required by an application. Also, a guiding region can have a thicker radial width to facilitate trapping of a larger fraction of the incoming beam profile if desired. Region 1606 is an example of such a design.

FIGS. 17-21 depict examples of fibers configured to enable maintenance and/or confinement of adjusted beam characteristics in the second length of fiber (e.g., fiber 208). These fiber designs are referred to as "ring-shaped confinement fibers" because they contain a central core surrounded by annular or ring-shaped cores. These designs are merely examples and not an exhaustive recitation of the variety of fiber RIPs that may be used to enable maintenance and/or confinement of adjusted beam characteristics within a fiber. Thus, claimed subject matter is not limited to the examples provided herein. Moreover, any of the first lengths of fiber described above with respect to FIGS. 11-16 may be combined with any of the second length of fiber described FIGS. 17-21.

Figure 17:
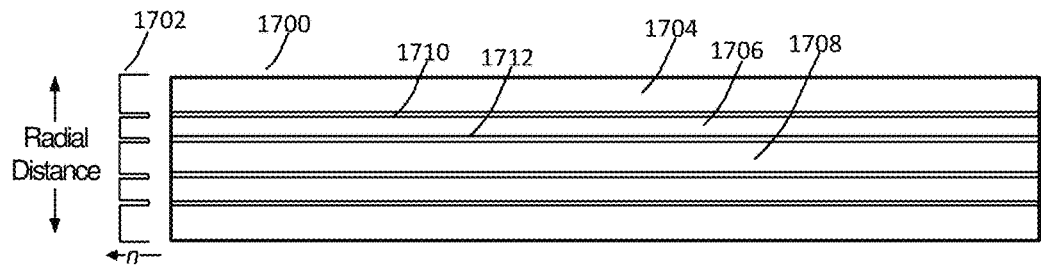
FIGS. 17-19 illustrate cross-sectional views of example second lengths of fiber ("confinement fibers") for confining adjusted beam characteristics in a fiber assembly.

FIG. 17 illustrates a cross-sectional view of an example second length of fiber for maintaining and/or confining adjusted beam characteristics in a VBC fiber assembly. As the perturbed beam is coupled from a first length of fiber to second length of fiber 1700, the second length of fiber 1700 may maintain at least a portion of the beam characteristics adjusted in response to perturbation in the first length of fiber within one or more of confinement regions 1704, 1706, and/or 1708. Fiber 1700 has a RIP 1702. Each of confinement regions 1704, 1706, and/or 1708 is bounded by a lower index layer 1710 and/or 1712. This design enables second length of fiber 1700 to maintain the adjusted beam characteristics. As a result, a beam output by fiber 1700 will substantially maintain the received adjusted beam as modified in the first length of fiber giving the output beam adjusted beam characteristics, which may be customized to a processing task or other application.

Figure 18:
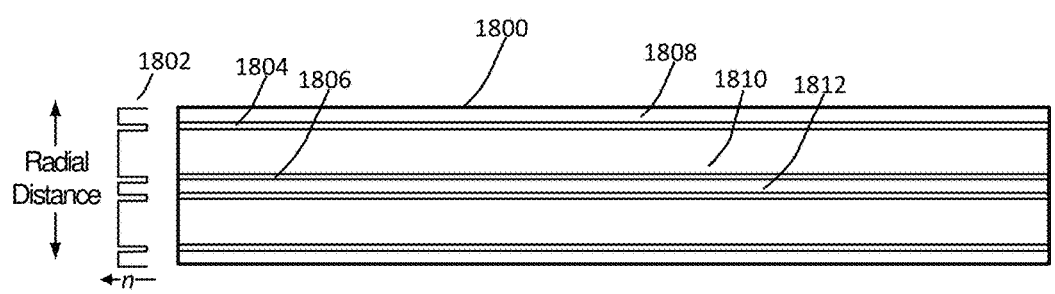

Similarly, FIG. 18 depicts a cross-sectional view of an example second length of fiber 1800 for maintaining and/or confining beam characteristics adjusted in response to perturbation in the first length of fiber in a VBC fiber assembly. Fiber 1800 has a RIP 1802. However, confinement regions 1808, 1810, and/or 1812 have different thicknesses than confinement regions 1704, 1706, and 1708. Each of confinement regions 1808, 1810, and/or 1812 is bounded by a lower index layer 1804 and/or 1806. Varying the thicknesses of the confinement regions (and/or barrier regions) enables tailoring or optimization of a confined adjusted radiance profile by selecting particular radial positions within which to confine an adjusted beam.

Figure 19:
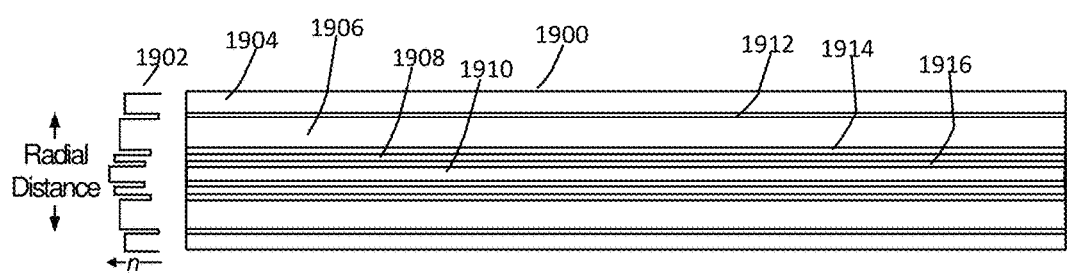

FIG. 19 depicts a cross-sectional view of an example second length of fiber 1900 having a RIP 1902 for maintaining and/or confining an adjusted beam in a VBC fiber assembly configured to provide variable beam characteristics. In this example, the number and thicknesses of confinement regions 1904, 1906, 1908, and 1910 are different from fiber 1700 and 1800 and the barrier layers 1912, 1914, and 1916 are of varied thicknesses as well. Furthermore, confinement regions 1904, 1906, 1908, and 1910 have different indexes of refraction and barrier layers 1912, 1914, and 1916 have different indexes of refraction as well. This design may further enable a more granular or optimized tailoring of the confinement and/or maintenance of an adjusted beam radiance to particular radial locations within fiber 1900. As the perturbed beam is launched from a first length of fiber to second length of fiber 1900 the modified beam characteristics of the beam (having an adjusted intensity distribution, radial position, and/or divergence angle, or the like, or a combination thereof) is confined within a specific radius by one or more of confinement regions 1904, 1906, 1908 and/or 1910 of second length of fiber 1900.

As noted previously, the divergence angle of a beam may be conserved or adjusted and then conserved in the second length of fiber. There are a variety of methods to change the divergence angle of a beam. The following are examples of fibers configured to enable adjustment of the divergence angle of a beam propagating from a first length of fiber to a second length of fiber in a fiber assembly for varying beam characteristics. However, these are merely examples and not an exhaustive recitation of the variety of methods that may be used to enable adjustment of divergence of a beam. Thus, claimed subject matter is not limited to the examples provided herein.

Figure 20:
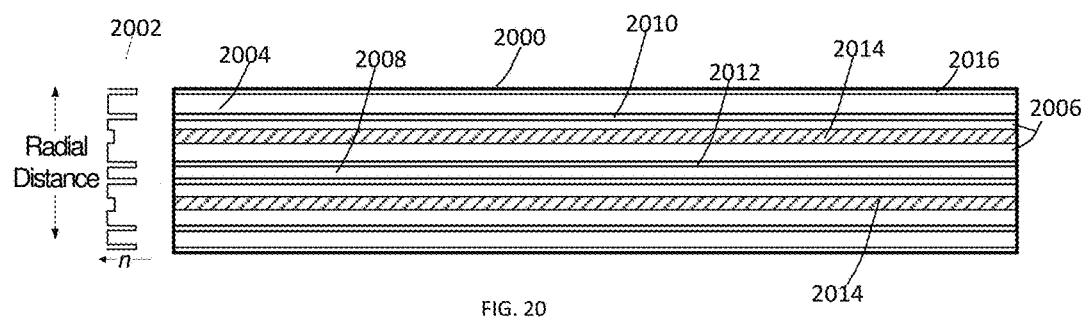
FIGS. 20 and 21 illustrate cross-sectional views of example second lengths of fiber for changing a divergence angle of and confining an adjusted beam in a fiber assembly configured to provide variable beam characteristics.

FIG. 20 depicts a cross-sectional view of an example second length of fiber 2000 having RIP 2002 for modifying, maintaining, and/or confining beam characteristics adjusted in response to perturbation in the first length of fiber. In this example, second length of fiber 2000 is similar to the previously described second lengths of fiber and forms a portion of the VBC fiber assembly for delivering variable beam characteristics as discussed above. There are three confinement regions 2004, 2006, and 2008 and three barrier layers 2010, 2012, and 2016. Second length of fiber 2000 also has a divergence structure 2014 situated within the confinement region 2006. The divergence structure 2014 is an area of material with a lower refractive index than that of the surrounding confinement region. As the beam is launched into second length of fiber 2000 refraction from divergence structure 2014 causes the beam divergence to increase in second length of fiber 2000. The amount of increased divergence depends on the amount of spatial overlap of the beam with the divergence structure 2014 and the magnitude of the index difference between the divergence structure 2014 and the core material. By adjusting the radial position of the beam near the launch point into the second length of fiber 2000, the divergence distribution may be varied. The adjusted divergence of the beam is conserved in fiber 2000, which is configured to deliver the adjusted beam to the process head, another optical system (e.g., fiber-to-fiber coupler or fiber-to-fiber switch), the work piece, or the like, or a combination thereof. In an example, divergence structure 2014 may have an index dip of about $10^{-5}$–$3\times10^{-2}$ with respect to the surrounding material. Other values of the index dip may be employed within the scope of this disclosure and claimed subject matter is not so limited.

Figure 21:
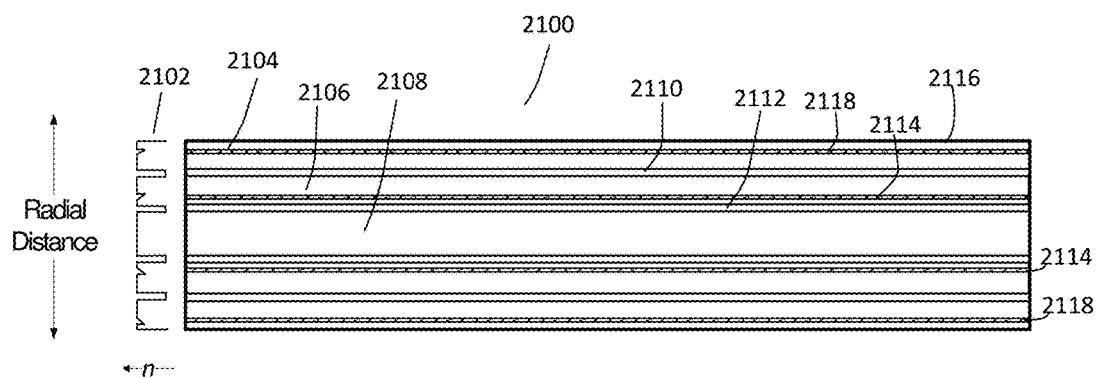

FIG. 21 depicts a cross-sectional view of an example second length of fiber 2100 having a RIP 2102 for modifying, maintaining, and/or confining beam characteristics adjusted in response to perturbation in the first length of fiber. Second length of fiber 2100 forms a portion of a VBC fiber assembly for delivering a beam having variable characteristics. In this example, there are three confinement regions 2104, 2106, and 2108 and three barrier layers 2110, 2112, and 2116. Second length of fiber 2100 also has a plurality of divergence structures 2114 and 2118. The divergence structures 2114 and 2118 are areas of graded lower index material. As the beam is launched from the first length fiber into second length of fiber 2100, refraction from divergence structures 2114 and 2118 causes the beam divergence to increase. The amount of increased divergence depends on the amount of spatial overlap of the beam with the divergence structure and the magnitude of the index difference between the divergence structure 2114 and/or 2118 and the surrounding core material of confinement regions 2106 and 2104 respectively. By adjusting the radial position of the beam near the launch point into the second length of fiber 2100, the divergence distribution may be varied. The design shown in FIG. 21 allows the intensity distribution and the divergence distribution to be varied somewhat independently by selecting both a particular confinement region and the divergence distribution within that conferment region (because each confinement region may include a divergence structure). The adjusted divergence of the beam is conserved in fiber 2100, which is configured to deliver the adjusted beam to the process head, another optical system, or the work piece. Forming the divergence structures 2114 and 2118 with a graded or non-constant index enables tuning of the divergence profile of the beam propagating in fiber 2100. An adjusted beam characteristic such as a radiance profile and/or divergence profile may be conserved as it is delivered to a process head by the second fiber. Alternatively, an adjusted beam characteristic such as a radiance profile and/or divergence profile may be conserved or further adjusted as it is routed by the second fiber through a fiber-to-fiber coupler (FFC) and/or fiber-to-fiber switch (FFS) and to a process fiber, which delivers the beam to the process head or the work piece.

Figure 26:
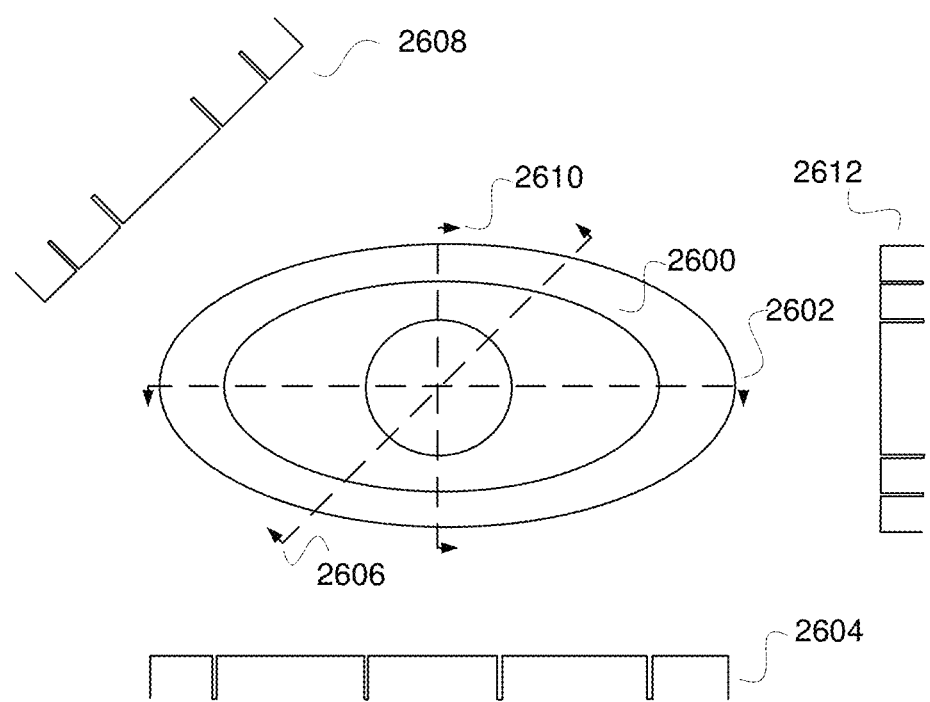
FIGS. 26-28 are cross-sectional views illustrating example second lengths of fiber ("confinement fibers") for confining adjusted beam characteristics in a fiber assembly.
Figure 27:
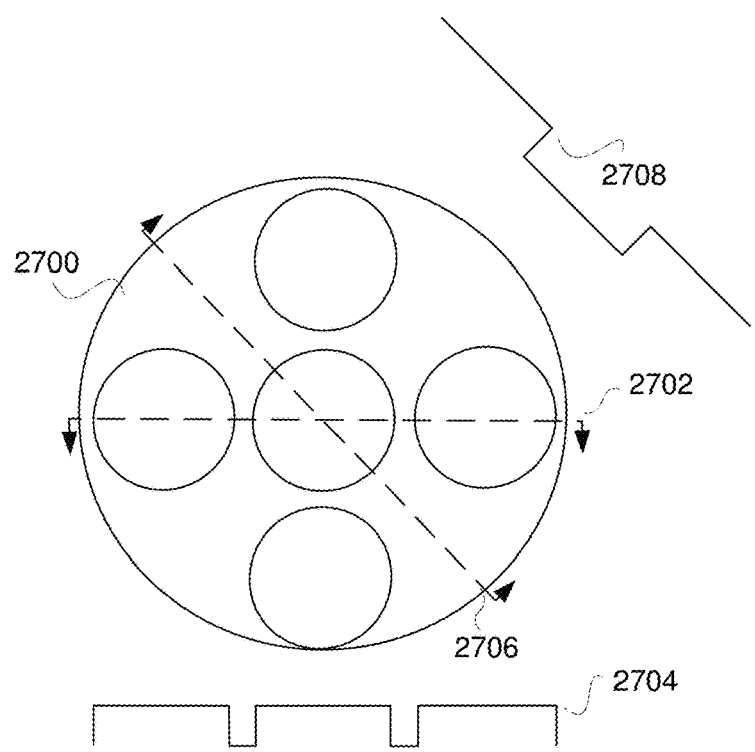
Figure 28:
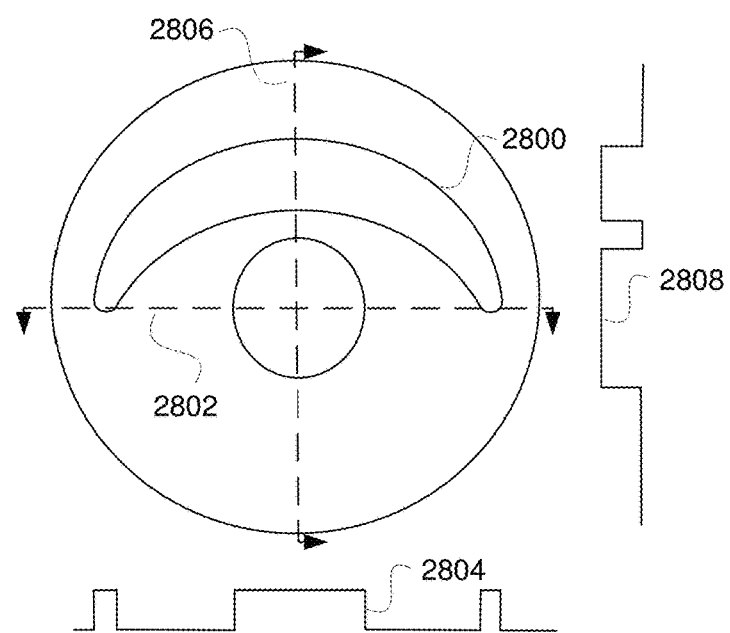

FIGS. 26-28 are cross-sectional views illustrating examples of fibers and fiber RIPs configured to enable maintenance and/or confinement of adjusted beam characteristics of a beam propagating in an azimuthally asymmetric second length of fiber wherein the beam characteristics are adjusted responsive to perturbation of a first length of fiber coupled to the second length of fiber and/or perturbation of the beam by a perturbation device 110. These azimuthally asymmetric designs are merely examples and are not an exhaustive recitation of the variety of fiber RIPs that may be used to enable maintenance and/or confinement of adjusted beam characteristics within an azimuthally asymmetric fiber. Thus, claimed subject matter is not limited to the examples provided herein. Moreover, any of a variety of first lengths of fiber (e.g., like those described above) may be combined with any azimuthally asymmetric second length of fiber (e.g., like those described in FIGS. 26-28).

FIG. 26 illustrates RIPs at various azimuthal angles of a cross-section through an elliptical fiber 2600. At a first azimuthal angle 2602, fiber 2600 has a first RIP 2604. At a second azimuthal angle 2606 that is rotated 45° from first azimuthal angle 2602, fiber 2600 has a second RIP 2608. At a third azimuthal angle 2610 that is rotated another 45° from second azimuthal angle 2606, fiber 2600 has a third RIP 2612. First, second and third RIPs 2604, 2608 and 2612 are all different.

FIG. 27 illustrates RIPs at various azimuthal angles of a cross-section through a multicore fiber 2700. At a first azimuthal angle 2702, fiber 2700 has a first RIP 2704. At a second azimuthal angle 2706, fiber 2700 has a second RIP 2708. First and second RIPs 2704 and 2708 are different. In an example, perturbation device 110 may act in multiple planes in order to launch the adjusted beam into different regions of an azimuthally asymmetric second fiber.

FIG. 28 illustrates RIPs at various azimuthal angles of a cross-section through a fiber 2800 having at least one crescent shaped core. In some cases, the corners of the crescent may be rounded, flattened, or otherwise shaped, which may minimize optical loss. At a first azimuthal angle 2802, fiber 2800 has a first RIP 2804. At a second azimuthal angle 2806, fiber 2800 has a second RIP 2808. First and second RIPs 2804 and 2808 are different.

Figure 22A:
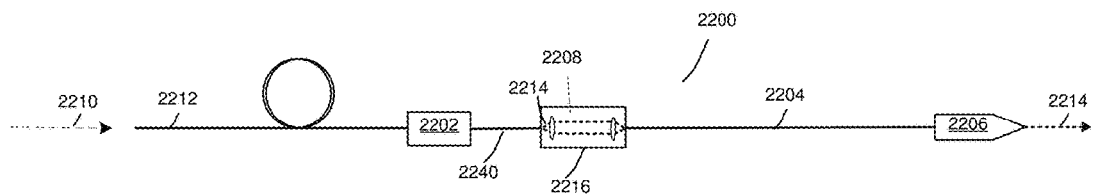
FIG. 22A illustrates an example laser system including a fiber assembly configured to provide variable beam characteristics disposed between a feeding fiber and process head.

FIG. 22A illustrates an example of a laser system 2200 including a VBC fiber assembly 2202 configured to provide variable beam characteristics. VBC fiber assembly 2202 comprises a first length of fiber 104, second length of fiber 108, and a perturbation device 110. VBC fiber assembly 2202 is disposed between feeding fiber 2212 (i.e., the output fiber from the laser source) and VBC delivery fiber 2240. VBC delivery fiber 2240 may comprise second length of fiber 108 or an extension of second length of fiber 108 that modifies, maintains, and/or confines adjusted beam characteristics. Beam 2210 is coupled into VBC fiber assembly 2202 via feeding fiber 2212. Fiber assembly 2202 is configured to vary the characteristics of beam 2210 in accordance with the various examples described above. The output of fiber assembly 2202 is adjusted beam 2214 which is coupled into VBC delivery fiber 2240. VBC delivery fiber 2240 delivers adjusted beam 2214 to free-space optics assembly 2208, which then couples beam 2214 into a process fiber 2204. Adjusted beam 2214 is then delivered to process head 2206 by process fiber 2204. The process head can include guided wave optics (such as fibers and fiber coupler), free space optics such as lenses, mirrors, optical filters, diffraction gratings), beam scan assemblies such as galvanometer scanners, polygonal mirror scanners, or other scanning systems that are used to shape the beam 2214 and deliver the shaped beam to a workpiece.

In laser system 2200, one or more of the free-space optics of assembly 2208 may be disposed in an FFC or other beam coupler 2216 to perform a variety of optical manipulations of an adjusted beam 2214 (represented in FIG. 22A with different dashing than beam 2210). For example, free-space optics assembly 2208 may preserve the adjusted beam characteristics of beam 2214. Process fiber 2204 may have the same RIP as VBC delivery fiber 2240. Thus, the adjusted beam characteristics of adjusted beam 2214 may be preserved all the way to process head 2206. Process fiber 2204 may comprise a RIP similar to any of the second lengths of fiber described above, including confinement regions.

Figure 22B:
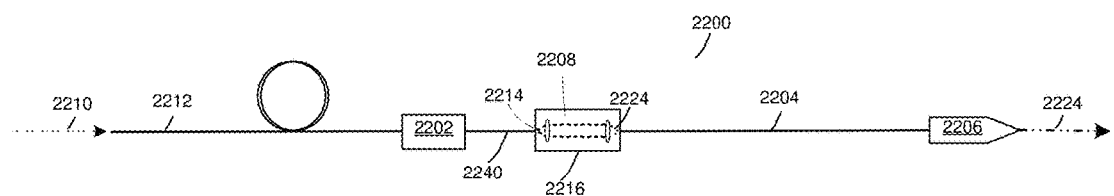
FIG. 22B illustrates an example laser system including a fiber assembly configured to provide variable beam characteristics disposed between a feeding fiber and process head.

Alternatively, as illustrated in FIG. 22B, free-space optics assembly 2208 may change the adjusted beam characteristics of beam 2214 by, for example, increasing or decreasing the divergence and/or the spot size of beam 2214 (e.g., by magnifying or demagnifying beam 2214) and/or otherwise further modifying adjusted beam 2214. Furthermore, process fiber 2204 may have a different RIP than VBC delivery fiber 2240. Accordingly, the RIP of process fiber 2204 may be selected to preserve additional adjustment of adjusted beam 2214 made by the free-space optics of assembly 2208 to generate a twice adjusted beam 2224 (represented in FIG. 22B with different dashing than beam 2214).

Figure 23:
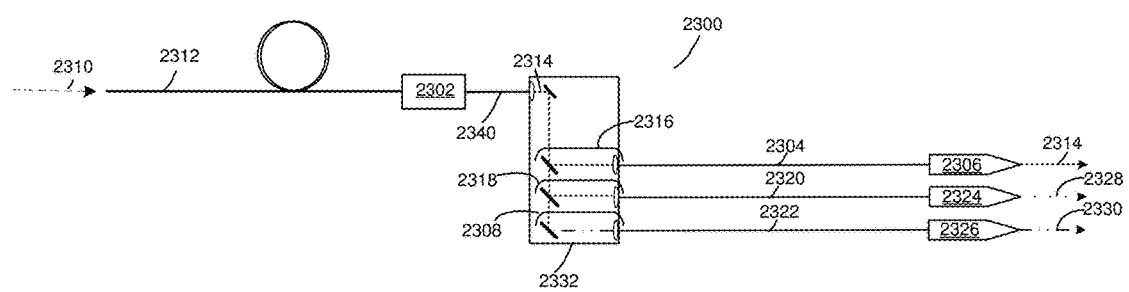
FIG. 23 illustrates an example laser system including a fiber assembly configured to provide variable beam characteristics disposed between a feeding fiber and multiple process fibers.

FIG. 23 illustrates an example of a laser system 2300 including VBC fiber assembly 2302 disposed between feeding fiber 2312 and VBC delivery fiber 2340. During operation, beam 2310 is coupled into VBC fiber assembly 2302 via feeding fiber 2312. Fiber assembly 2302 includes a first length of fiber 104, second length of fiber 108, and a perturbation device 110 and is configured to vary characteristics of beam 2310 in accordance with the various examples described above. Fiber assembly 2302 generates adjusted beam 2314 output by VBC delivery fiber 2340. VBC delivery fiber 2340 comprises a second length of fiber 108 of fiber for modifying, maintaining, and/or confining adjusted beam characteristics in a fiber assembly 2302 in accordance with the various examples described above (see FIGS. 17-21, for example). VBC delivery fiber 2340 couples adjusted beam 2314 into beam switch (FFS) 2332, which then couples its various output beams to one or more of multiple process fibers 2304, 2320, and 2322. Process fibers 2304, 2320, and 2322 deliver adjusted beams 2314, 2328, and 2330 to respective process heads 2306, 2324, and 2326.

In an example, beam switch 2332 includes one or more sets of free-space optics 2308, 2316, and 2318 configured to perform a variety of optical manipulations of adjusted beam 2314. Free-space optics 2308, 2316, and 2318 may preserve or vary adjusted beam characteristics of beam 2314. Thus, adjusted beam 2314 may be maintained by the free-space optics or adjusted further. Process fibers 2304, 2320, and 2322 may have the same or a different RIP as VBC delivery fiber 2340, depending on whether it is desirable to preserve or further modify a beam passing from the free-space optics assemblies 2308, 2316, and 2318 to respective process fibers 2304, 2320, and 2322. In other examples, one or more beam portions of beam 2310 are coupled to a workpiece without adjustment, or different beam portions are coupled to respective VBC fiber assemblies so that beam portions associated with a plurality of beam characteristics can be provided for simultaneous workpiece processing. Alternatively, beam 2310 can be switched to one or more of a set of VBC fiber assemblies.

Routing adjusted beam 2314 through any of free-space optics assemblies 2308, 2316, and 2318 enables delivery of a variety of additionally adjusted beams to process heads 2306, 2324, and 2326. Therefore, laser system 2300 provides additional degrees of freedom for varying the characteristics of a beam, as well as switching the beam between process heads ("time sharing") and/or delivering the beam to multiple process heads simultaneously ("power sharing").

For example, free-space optics in beam switch 2332 may direct adjusted beam 2314 to free-space optics assembly 2316 configured to preserve the adjusted characteristics of beam 2314. Process fiber 2304 may have the same RIP as VBC delivery fiber 2340. Thus, the beam delivered to process head 2306 will be a preserved adjusted beam 2314.

In another example, beam switch 2332 may direct adjusted beam 2314 to free-space optics assembly 2318 configured to preserve the adjusted characteristics of adjusted beam 2314. Process fiber 2320 may have a different RIP than VBC delivery fiber 2340 and may be configured with divergence altering structures as described with respect to FIGS. 20 and 21 to provide additional adjustments to the divergence distribution of beam 2314. Thus, the beam delivered to process head 2324 will be a twice adjusted beam 2328 having a different beam divergence profile than adjusted beam 2314.

Process fibers 2304, 2320, and/or 2322 may comprise a RIP similar to any of the second lengths of fiber described above, including confinement regions or a wide variety of other RIPs, and claimed subject matter is not limited in this regard.

In yet another example, free-space optics switch 2332 may direct adjusted beam 2314 to free-space optics assembly 2308 configured to change the beam characteristics of adjusted beam 2314. Process fiber 2322 may have a different RIP than VBC delivery fiber 2340 and may be configured to preserve (or alternatively further modify) the new further adjusted characteristics of beam 2314. Thus, the beam delivered to process head 2326 will be a twice adjusted beam 2330 having different beam characteristics (due to the adjusted divergence profile and/or intensity profile) than adjusted beam 2314.

In FIGS. 22A, 22B, and 23, the optics in the FFC or FFS may adjust the spatial profile and/or divergence profile by magnifying or demagnifying the beam 2214 before launching into the process fiber. They may also adjust the spatial profile and/or divergence profile via other optical transformations. They may also adjust the launch position into the process fiber. These methods may be used alone or in combination.

FIGS. 22A, 22B, and 23 merely provide examples of combinations of adjustments to beam characteristics using free-space optics and various combinations of fiber RIPs to preserve or modify adjusted beams 2214 and 2314. The examples provided above are not exhaustive and are meant for illustrative purposes only. Thus, claimed subject matter is not limited in this regard.

Figure 24:
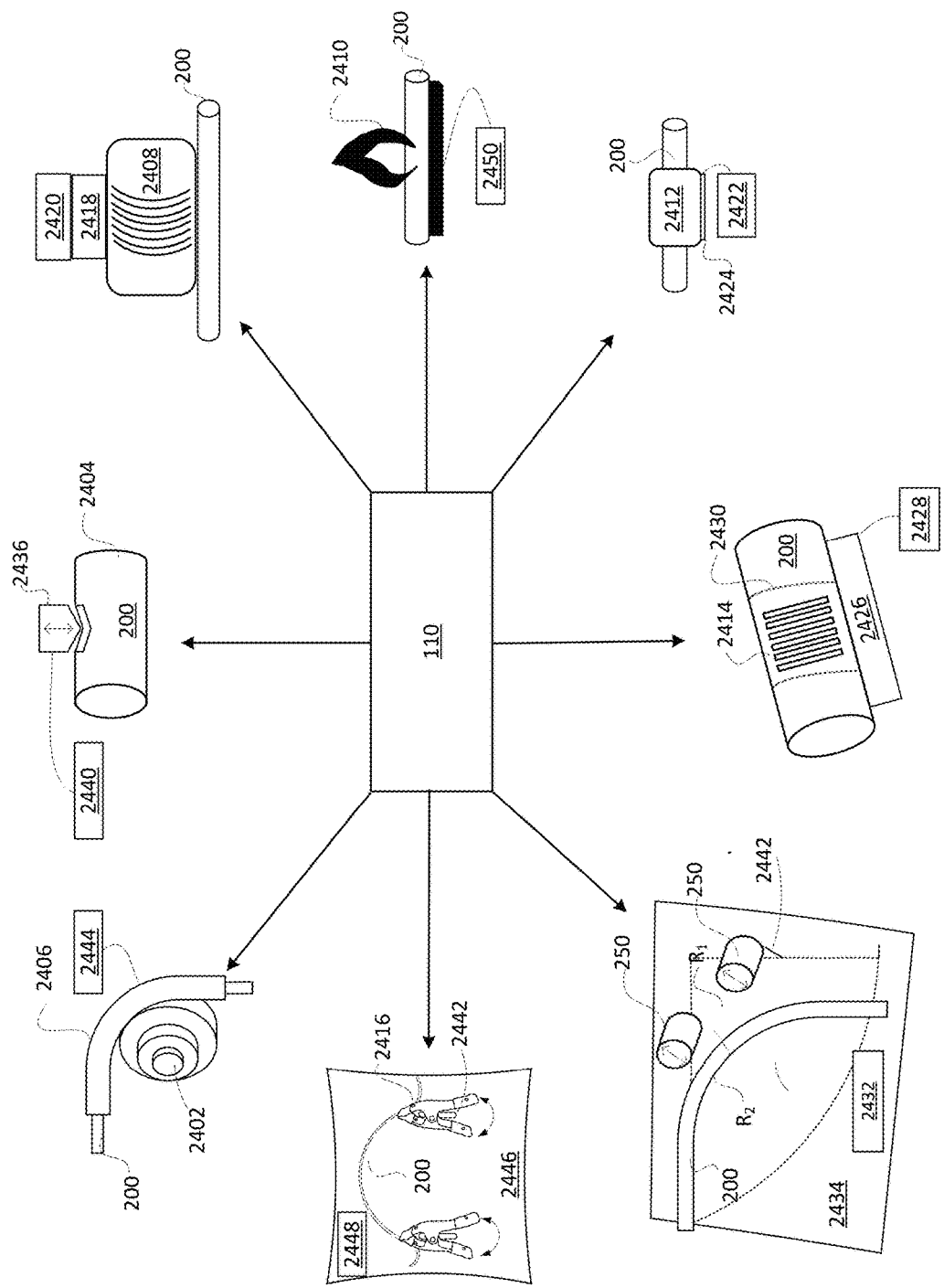
FIG. 24 illustrates examples of various perturbation assemblies for providing variable beam characteristics according to various examples provided herein.

FIG. 24 illustrates various examples of perturbation devices, assemblies or methods (for simplicity referred to collectively herein as "perturbation device 110") for perturbing a VBC fiber 200 and/or an optical beam propagating in VBC fiber 200 according to various examples provided herein. Perturbation device 110 may be any of a variety of devices, methods, and/or assemblies configured to enable adjustment of beam characteristics of a beam propagating in VBC fiber 200. In an example, perturbation device 110 may be a mandrel 2402, a micro-bend 2404 in the VBC fiber, flexible tubing 2406, an acousto-optic transducer 2408, a thermal device 2410, a piezo-electric device 2412, a grating 2414, a clamp 2416 (or other fastener), or the like, or any combination thereof. These are merely examples of perturbation devices 110 and not an exhaustive listing of perturbation devices 110 and claimed subject matter is not limited in this regard.

Mandrel 2402 may be used to perturb VBC fiber 200 by providing a form about which VBC fiber 200 may be bent. As discussed above, reducing the bend radius of VBC fiber 200 moves the intensity distribution of the beam radially outward. In some examples, mandrel 2402 may be stepped or conically shaped to provide discrete bend radii levels. Alternatively, mandrel 2402 may comprise a cone shape without steps to provide continuous bend radii for more granular control of the bend radius. The radius of curvature of mandrel 2402 may be constant (e.g., a cylindrical form) or non-constant (e.g., an oval-shaped form). Similarly, flexible tubing 2406, clamps 2416 (or other varieties of fasteners), or rollers 250 may be used to guide and control the bending of VBC fiber 200 about mandrel 2402. Furthermore, changing the length over which the fiber is bent at a particular bend radius also may modify the intensity distribution of the beam. VBC fiber 200 and mandrel 2402 may be configured to change the intensity distribution within the first fiber predictably (e.g., in proportion to the length over which the fiber is bent and/or the bend radius). Rollers 250 may move up and down along a track 2442 on platform 2434 to change the bend radius of VBC fiber 200.

Clamps 2416 (or other fasteners) may be used to guide and control the bending of VBC fiber 200 with or without a mandrel 2402. Clamps 2416 may move up and down along a track 2442 or platform 2446. Clamps 2416 may also swivel to change bend radius, tension, or direction of VBC fiber 200. Controller 2448 may control the movement of clamps 2416.

In another example, perturbation device 110 may be flexible tubing 2406 and may guide bending of VBC fiber 200 with or without a mandrel 2402. Flexible tubing 2406 may encase VBC fiber 200. Tubing 2406 may be made of a variety of materials and may be manipulated using piezo-electric transducers controlled by controller 2444. In another example, clamps or other fasteners may be used to move flexible tubing 2406.

Micro-bend 2404 in VBC fiber is a local perturbation caused by lateral mechanical stress on the fiber. Micro-bending can cause mode coupling and/or transitions from one confinement region to another confinement region within a fiber, resulting in varied beam characteristics of the beam propagating in a VBC fiber 200. Mechanical stress may be applied by an actuator 2436 that is controlled by controller 2440. However, this is merely an example of a method for inducing mechanical stress in fiber 200 and claimed subject matter is not limited in this regard.

Acousto-optic transducer (AOT) 2408 may be used to induce perturbation of a beam propagating in the VBC fiber using an acoustic wave. The perturbation is caused by the modification of the refractive index of the fiber by the oscillating mechanical pressure of an acoustic wave. The period and strength of the acoustic wave are related to the acoustic wave frequency and amplitude, allowing dynamic control of the acoustic perturbation. Thus, a perturbation device 110 including AOT 2408 may be configured to vary the beam characteristics of a beam propagating in the fiber. In an example, piezo-electric transducer 2418 may create the acoustic wave and may be controlled by controller or driver 2420. The acoustic wave induced in AOT 2408 may be modulated to change and/or control the beam characteristics of the optical beam in VBC 200 in real-time. However, this is merely an example of a method for creating and controlling an AOT 2408 and claimed subject matter is not limited in this regard.

Thermal device 2410 may be used to induce perturbation of a beam propagating in VBC fiber using heat. The perturbation is caused by the modification of the RIP of the fiber induced by heat. Perturbation may be dynamically controlled by controlling an amount of heat transferred to the fiber and the length over which the heat is applied. Thus, a perturbation device 110 including thermal device 2410 may be configured to vary a range of beam characteristics. Thermal device 2410 may be controlled by controller 2450.

Piezo-electric transducer 2412 may be used to induce perturbation of a beam propagating in a VBC fiber using piezoelectric action. The perturbation is caused by the modification of the RIP of the fiber induced by a piezoelectric material attached to the fiber. The piezoelectric material in the form of a jacket around the bare fiber may apply tension or compression to the fiber, modifying its refractive index via the resulting changes in density. Perturbation may be dynamically controlled by controlling a voltage to the piezo-electric device 2412. Thus, a perturbation device 110 including piezo-electric transducer 2412 may be configured to vary the beam characteristics over a particular range.

In an example, piezo-electric transducer 2412 may be configured to displace VBC fiber 200 in a variety of directions (e.g., axially, radially, and/or laterally) depending on a variety of factors, including how the piezo-electric transducer 2412 is attached to VBC fiber 200, the direction of the polarization of the piezo-electric materials, the applied voltage, etc. Additionally, bending of VBC fiber 200 is possible using the piezo-electric transducer 2412. For example, driving a length of piezo-electric material having multiple segments comprising opposing electrodes can cause a piezo-electric transducer 2412 to bend in a lateral direction. Voltage applied to piezoelectric transducer 2412 by electrode 2424 may be controlled by controller 2422 to control displacement of VBC fiber 200. Displacement may be modulated to change and/or control the beam characteristics of the optical beam in VBC 200 in real-time. However, this is merely an example of a method of controlling displacement of a VBC fiber 200 using a piezo-electric transducer 2412 and claimed subject matter is not limited in this regard.

Gratings 2414 may be used to induce perturbation of a beam propagating in a VBC fiber 200. A grating 2414 can be written into a fiber by inscribing a periodic variation of the refractive index into the core. Gratings 2414 such as fiber Bragg gratings can operate as optical filters or as reflectors. A long-period grating can induce transitions among co-propagating fiber modes. The radiance, intensity profile, and/or divergence profile of a beam comprised of one or more modes can thus be adjusted using a long-period grating to couple one or more of the original modes to one or more different modes having different radiance and/or divergence profiles. Adjustment is achieved by varying the periodicity or amplitude of the refractive index grating. Methods such as varying the temperature, bend radius, and/or length (e.g., stretching) of the fiber Bragg grating can be used for such adjustment. VBC fiber 200 having gratings 2414 may be coupled to stage 2426. Stage 2426 may be configured to execute any of a variety of functions and may be controlled by controller 2428. For example, stage 2426 may be coupled to VBC fiber 200 with fasteners 2430 and may be configured to stretch and/or bend VBC fiber 200 using fasteners 2430 for leverage. Stage 2426 may have an embedded thermal device and may change the temperature of VBC fiber 200.

Figure 25:
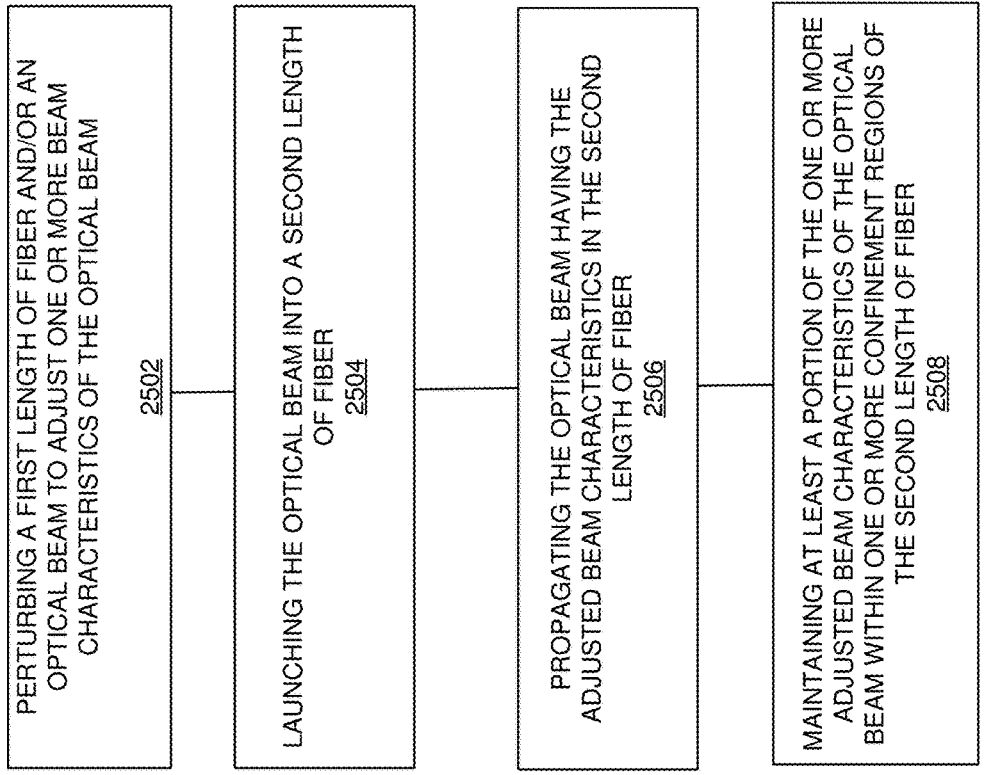
FIG. 25 illustrates an example process for adjusting and maintaining modified characteristics of an optical beam.

FIG. 25 illustrates an example process 2500 for adjusting and/or maintaining beam characteristics within a fiber without the use of free-space optics to adjust the beam characteristics. In block 2502, a first length of fiber and/or an optical beam are perturbed to adjust one or more optical beam characteristics. Process 2500 moves to block 2504, where the optical beam is launched into a second length of fiber. Process 2500 moves to block 2506, where the optical beam having the adjusted beam characteristics is propagated in the second length of fiber. Process 2500 moves to block 2508, where at least a portion of the one or more beam characteristics of the optical beam are maintained within one or more confinement regions of the second length of fiber. The first and second lengths of fiber may be comprised of the same fiber, or they may be different fibers.

ADDITIONAL EMBODIMENTS

Additional implementations of a fiber assembly, an optical beam system comprising a fiber assembly, and a method for manipulating an optical beam propagating in a fiber assembly are described herein. Such implementations provide for a laser output that can be adjusted (e.g., switched) between, for example, a characteristic of a laser source such as a direct-diode laser (i.e., the pump) and a fiber laser. Desired beam characteristics between the two can be obtained by launching only a portion of the pump light (i.e., source optical beam) into at least one specially designed confinement region in a fiber assembly comprising a first length of fiber and a second length of fiber which can be a multi-core fiber. That is, the second length of fiber can comprise at least one wavelength-modifying confinement region and can include at least one passive confinement region. For example, FIG. 29A includes an illustration of a laser system 2900 comprising, among other things, a fiber assembly 2903 capable of manipulating an optical beam, for example, by modifying the frequency of an optical beam (e.g., laser beam) and/or varying the beam characteristics of the optical beam, in either order. FIG. 29B illustrates a zoomed-in cross-sectional view of the fiber assembly 2903 comprising a first length of fiber 2910 such as the first length of fiber as described above, and a second length of fiber 2912 such as the second length of fiber as described above and/or comprising at least one wavelength-modifying confinement region. FIGS. 30A-30B, 31A-31B, 32A-32B, and 33A-33B include cross-sectional views of examples of the second length of fiber 3000, 3100, 3200 and 3300, respectively, and comprising at least one wavelength-modifying confinement region 3001, 3101, 3201 and 3301, respectively, which can each separately in combinations be implemented as second length of fiber of fiber assembly 2903 of FIG. 29. Additionally, FIGS. 33A-33C illustrate example methods for manipulating optical beams, for example, by modifying the optical beam's wavelength in a fiber assembly comprising a second fiber having a wavelength-modifying confinement region.

FIG. 29A illustrates an example of a laser system 2900 including an optical beam source 2901 which can be a device that can generate an optical beam 2902 (e.g., a laser beam); and fiber assembly 2903 in optical communication with the optical beam source 2901 and situated to receive and manipulate the optical beam. For example, fiber assembly 2903 can provide variable beam characteristics and/or can modify the optical beam's frequency, including from a first wavelength ($\lambda_1$) to at least a second wavelength ($\lambda 2$) to form modified beam 2908 which can be emitted from process head 2905.

The laser system 2900 described herein may be utilized or suitable for several laser related applications. In at least one implementation, as further described herein, the laser system 2900 may be utilized as a multi-wavelength system, such as a multi-wavelength system utilized in an additive manufacturing system.

An optical beam source 2901 can be a diode pumped solid state laser, micro-chip laser, actively or passively q-switched laser, diode laser, mode-locked laser, gain-switched laser, fiber laser, or combination of one or more thereof. Optical beam source 2901 can be operated with a continuous wave output or with a pulsed or modulated output or a wavelength chirped pulse output. In some examples, the light source has a polarized output. The optical beam source 2901 can produce a source optical beam 2902 having a first wavelength ($\lambda_1$)

The optical beam source 2901 can generate the source optical beam 2902 in pulses having durations in a range of, for example, from about 1 femtosecond to about 100 femtoseconds. In general, a particular pulse duration may be selected based on the desired application for the output of systems described herein, or it may be selected based on cost. A pulse compressor can be used to reduce pulse duration even further, such as to provide pulses having durations in the picosecond and femtosecond range.

Fiber assembly 2903 is disposed between feeding fiber 2904 (the output fiber from an optical beam source 2901) and delivery fiber 2906. Source optical beam 2902 is coupled into fiber assembly 2903 via feeding fiber 2904. For example, feeding fiber 2904 can be situated to couple the source optical beam 2902 to the fiber assembly 2903. Fiber assembly 2903 is configured to vary (i.e., modify or adjust) the beam characteristics of an input beam (e.g., source optical beam 2902) in accordance with the various examples described above and/or to modify the source optical beam's frequency, including from a first wavelength ($\lambda_1$) to at least a second wavelength ($\lambda_2$) to form modified beam 2908.

As illustrated in FIG. 29B, optical fiber assembly 2903 comprises a first length of fiber 2910 having an input portion 2911 and second length of fiber 2912 having an output portion 2913. First length of fiber 2904 and second length of fiber 2908 may be the same or different fibers and may have the same or different RIPs. The first length of fiber 2904 and the second length of fiber 2908 may be joined together by a splice. First length of fiber 2904 and second length of fiber 2908 may be coupled in other ways, may be spaced apart, or may be connected via an interposing component such as another length of fiber, free-space optics, glue, index-matching material, or the like or any combination thereof.

A perturbation device 2914 is disposed proximal to and/or envelops perturbation region 2916. Perturbation device 2914 may be a device, assembly, in-fiber structure, and/or other feature as described above. Perturbation device 2914 is configured to perturb optical beam 2902 in order to adjust one or more beam characteristics of optical beam 2902 (as represented by adjusted beam 2902'). Adjustment of beam 2902 by perturbation device 2914 may occur in first length of fiber 2910, second length of fiber 2912 or a combination thereof. Perturbation region 2914 may extend over various widths and may or may not extend into a portion of second length of fiber 2912. As beam 2902 propagates in fiber assembly 2903, perturbation device 2914 may physically act on fiber assembly 2903 to perturb the fiber (e.g., the first length of fiber) and adjust the characteristics of beam 2902. Alternatively, perturbation device 2910 may act directly on beam 2902 to alter its beam characteristics. Subsequent to being adjusted, a perturbed beam 2902' can have different beam characteristics than beam 2902, which can be fully or partially conserved in second length of fiber 2912. In another example, perturbation device 2914 need not be disposed near a splice. Moreover, a splice may not be needed at all. For example, fiber assembly 2903 may be a single fiber. In an implementation, first length of fiber 2910 and second length of fiber 2912 can be spaced apart, or secured with a small gap (air-spaced or filled with an optical material, such as optical cement or an index-matching material).

Perturbation device 2914 can be used to launch beam 2902 as adjusted beam 2902' into at least one confinement region of second length of fiber 2912. For example, adjusted beam 2902' can be launched from the first length of fiber and into one or more of at least one passive confinement region at least one wavelength-modifying confinement region of the second length of fiber 2912. Upon being launched from first length of fiber 2910, perturbed optical beam 2902' propagates through one or more of the at least one passive confinement region, the at least one wavelength-modifying confinement region or both of the second length of fiber 2912 as beam 2908. In the case that the optical beam 2908 propagates through the passive confinement region of the second length of fiber, it is emitted from the output portion 2913 having the same wavelength ($\lambda 1$) as the wavelength ($\lambda 1$) it had upon entering at the input portion 2911. In the case that the optical beam 2908 propagates through the wavelength-modifying confinement region of the second length of fiber, it is emitted from the output portion 2913 having a different wavelength ($\lambda 2$) than the wavelength ($\lambda 1$) it had upon entering at the input portion 2911. Perturbation device 2914 can be activated to toggle the coupling of the optical beam between the at least one wavelength-modifying confinement region and the passive confinement region of the second length of fiber. Such toggling depends on the application for which the optical beam is being used. For example, in the case of additive manufacturing via laser melting or sintering, depositing of a layer of laser-melted material in a manner to control the final microstructure of the material after solidification may require rapid heating and cooling of the material. Such rapid heating and cooling can result from switching of the output optical beam's wavelength from a first wavelength to a second wavelength as controlled by the perturbation device toggling of the beam optical beam propagating within the fiber assembly so as to launch it between at least one passive confinement region and the at least one wavelength-modifying confinement region of the second length of fiber.

In an implementation, first length of fiber 2910 can include a first refractive index profile (RIP) to enable adjustment/modification of one or more beam characteristics of an optical beam propagating within the first length of fiber 2910. For example, first length of fiber 2910 can have an input portion 2911 at which an input optical beam (e.g., source beam 2902) having a first wavelength $\lambda_1$ is coupled into the first length of fiber 2910. The second length of fiber 2912 can include at least one wavelength-modifying confinement region (see FIGS. 30A-30G) and can be situated to receive the optical beam from the first length of fiber 2910 and emit an output optical beam (e.g., optical beam 2908) having either a second wavelength $\lambda_2$ that may be the same as or different than the first wavelength.

Returning to FIG. 29A, feeding fiber 2904 can comprise the first length of fiber 2910 and delivery fiber 2906 may comprise second length of fiber 2912. In an implementation, therefore, the output of fiber assembly 2903 is optical beam 2908 which may or may not be modified with respect to one or more beam characteristics of the optical beam upon it being coupled to the fiber assembly 2903 as source beam 2902.

As described above, optical beam 2908 can have a wavelength that is different than a wavelength of source beam 2902 due, at least in part, to at least a source beam 2902 being launched at (as beam 2902') and coupled into second length of fiber 2912, for example, to propagate through the second length of fiber's wavelength-modifying confinement region. Modified beam 2908 can be delivered to process head 2905 directly via delivery fiber 2906, or, may be further modified by being coupled into or through other components that can be disposed between fiber assembly 2903 and process head 2905. Such components can include, for example, at least one non-linear frequency-conversion stage (e.g., a nonlinear crystal), a coupler (e.g., free-space optics). The process head can include guided wave optics (such as fibers and fiber coupler), free space optics such as lenses, mirrors, optical filters, diffraction gratings), beam scan assemblies such as galvanometer scanners, polygonal mirror scanners, or other scanning systems that are used to shape the output beam and deliver a shaped beam to a workpiece.

As described above, fiber assembly 2903 can include a first length of fiber comprising a first refractive-index profile (RIP), a second length of fiber (which may have a second RIP) and can be coupled to the first length of fiber, and a perturbation device configured to a perturbation device configured to adjust one or more beam characteristics of an optical beam in one or more of the first length of fiber, in the second length of fiber, or in the first and second lengths of fiber. However, as described below, the fiber assembly 2903 is not so limited and may comprise other features. For example, the second length of fiber in the fiber assembly 2903 can include at least one wavelength-modifying confinement region, at least one passive confinement region, or combinations thereof. The second length of fiber in the fiber assembly 2903 can include at least one cladding structure disposed between the at least one passive confinement region and the at least one wavelength-modifying confinement region, wherein the cladding structure can comprise a lower-index than an index of the at least one wavelength-modifying confinement region.

Fiber parameters in addition to or separate from any of those described above and shown in FIGS. 1-2 and 17-21 may be used for optical fiber assembly 2903 and still be within the scope of the claimed subject matter. For example, optical fiber assembly 2903 can include features/parameters of VBC fiber assembly as described above. For example, as described above for the VBC fiber 100, the fiber assembly 2903 may be manufactured by a variety of methods including PCVD (Plasma Chemical Vapor Deposition), OVD (Outside Vapor Deposition), VAD (Vapor Axial Deposition), MOCVD (Metal-Organic Chemical Vapor Deposition.) and/or DND (Direct Nanoparticle Deposition). As described above for VBC fiber 100, the fiber assembly 2903 may comprise a variety of materials. For example, fiber assembly 2903, including the first length of fiber and/or the second length of fiber, including the at least one wavelength-modifying confinement region and/or the at least one passive confinement region may comprise $SiO_2$, $SiO_2$ doped with $GeO_2$, germanosilicate, phosphorus pentoxide, phosphosilicate, $Al_2O_3$, aluminosilicate, or the like or any combinations thereof. The at least one wavelength-modifying confinement region and/or the at least one passive confinement region may be bounded by a cladding structure comprising cladding doped with fluorine, boron, or the like or any combinations thereof.

In an implementation, the at least one wavelength-modifying confinement region comprises a first wavelength-modifying confinement region and a second wavelength-modifying confinement region, wherein the first wavelength-modifying confinement region and the second wavelength-modifying confinement region are the same or different, for example, with respect to one or more physical features and functional features, including but not limited to dimensions, electronic properties, optical properties, materials, orientation, designs and the like. In an implementation, the first wavelength-modifying confinement region and the second wavelength-modifying confinement region are disposed coaxially in the second length of fiber. In an implementation, the first wavelength-modifying confinement region and the second wavelength-modifying confinement region are disposed non-coaxially in the second length of fiber.

The at least one passive confinement region can be arranged to encompass the at least one wavelength-modifying confinement region. That is, the at least one wavelength-modifying confinement region can be completely surrounded by the at least one passive confinement region. In an implementation, the at least one passive confinement region and the wavelength-modifying confinement region are disposed coaxially in the second length of fiber. For example, the at least one wavelength-modifying confinement region and the at least one passive confinement region may each extend along a length (or central axis) of a second length of fiber of a fiber assembly. In an implementation, the at least one passive confinement region and the wavelength-modifying confinement region are disposed non-coaxially.

In an implementation, the at least one wavelength-modifying confinement region comprises at least one Raman cavity wherein the Raman cavity enables red-shifting of a wavelength propagating therein by one or more Stokes orders. In an implementation, the at least one wavelength-modifying confinement region comprises a first wavelength-modifying confinement region and a second wavelength-modifying confinement region. In an example, the first wavelength-modifying confinement region comprises a first Raman cavity that enables red-shifting of the first wavelength to a second wavelength, and the second wavelength-modifying confinement region comprises a second Raman cavity that enables red-shifting of the first wavelength to a wavelength different than the second wavelength.

In an implementation, the at least one wavelength-modifying confinement region comprises a rare-earth doped core. Dopants that may be included in the wavelength-modifying confinement region, include rare-earth ions such as $Er^{3+}$ (erbium), $Yb^{3+}$ (ytterbium), $Nd^{3+}$ (neodymium), $Tm^{3+}$ (thulium), $Ho^{3+}$ (holmium), or the like or any combination thereof. As described above, the at least one wavelength-modifying confinement region can comprise a first wavelength-modifying confinement region and a second wavelength-modifying confinement region. Thus, in an implementation, the first wavelength-modifying confinement region comprises a first rare-earth doped core and the second wavelength-modifying confinement region comprises a second rare-earth doped core. The first rare-earth doped core and the second rare-earth doped core may be the same as or different from one another. For example, the first rare-earth doped core and the second rare-earth doped core may share substantially similar dimensions, matrix materials, dopants, dopant concentrations, combinations thereof and other features. Conversely, the first rare-earth doped core and the second rare-earth doped core may be different with respect to their dimensions, matrix materials, dopants, dopant concentrations, combinations thereof and other features.

In an implementation, the at least one wavelength-modifying confinement region comprises a resonator which can comprise a saturable absorber material disposed in, for example, a core of the second length of fiber.

Examples of the second length of fiber that can comprise one or more of the features described above are illustrated in the cross-sectional views in FIGS. 30A-30B, 31A-31B, 32A-32B, and 33A-33B.

Figure 30A:
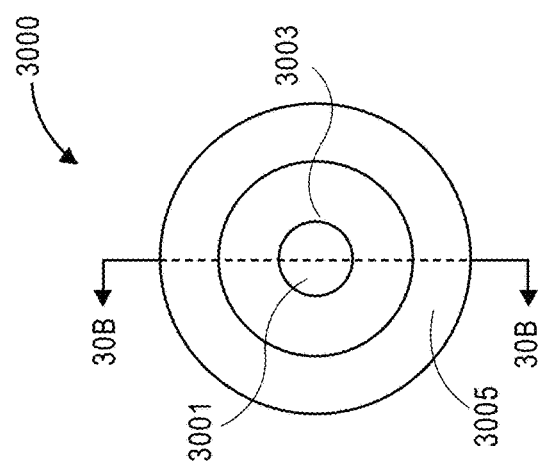
FIGS. 30A-30B illustrate cross-sectional views of exemplary second lengths of a fiber assembly for confining adjusted beam characteristics and/or variable wavelengths.
Figure 30B:
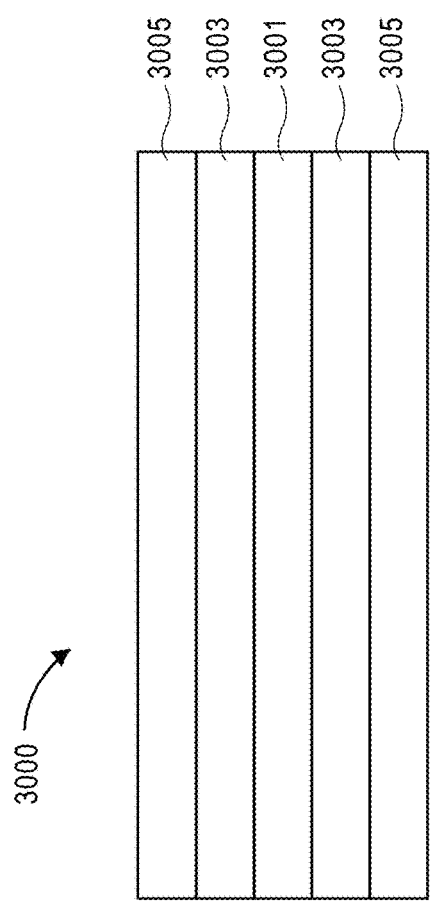

Illustrated in FIG. 30A is an axial cross-sectional view (end-face geometry) of a second length of fiber 3000 which may be implemented as the second length of fiber in a fiber assembly described above. FIG. 30B is a longitudinal cross-sectional view (length-wise geometry) of the fiber 3000 at cut-through line 30B-30B of FIG. 30A. The second length of fiber 3000 includes at least one wavelength-modifying confinement region 3001 and at least one passive confinement region 3005 that encompasses the at least one wavelength-modifying confinement region 3001. Passive confinement region 3005 is separated from wavelength-modifying confinement region 3001 by at least one cladding structure 3003.

In an implementation of a fiber assembly comprising the second length of fiber 3000, the at least one wavelength-modifying confinement region 3001 is a Raman cavity or a center core of a waveguide that is rare-earth (RE) doped or doped with a saturable absorber and that can change a source optical beam's wavelength as it propagates through the second length of fiber. In such an implementation, a perturbation device of a fiber assembly, as described above, can be used to adjust a beam such that when the source beam is coupled to the wavelength-modifying confinement region 3001, the source optical beam's initial wavelength ($\lambda 1$) is changed to an emission wavelength ($\lambda 2$), wherein $\lambda 1$ and $\lambda 2$ are different from one another. In such an implementation, the passive confinement region 3005 is a waveguide that can transmit the pump beam directly through the second length of fiber without substantial changes to the source's wavelength. Accordingly, an optical beam coupled to the second length of fiber upon being launched from the first length can be emitted at the same wavelength ($\lambda 1$) upon exiting the second length of fiber as its initial wavelength ($\lambda 1$) (i.e., a laser source's wavelength is the emitted wavelength).

Figure 31A:
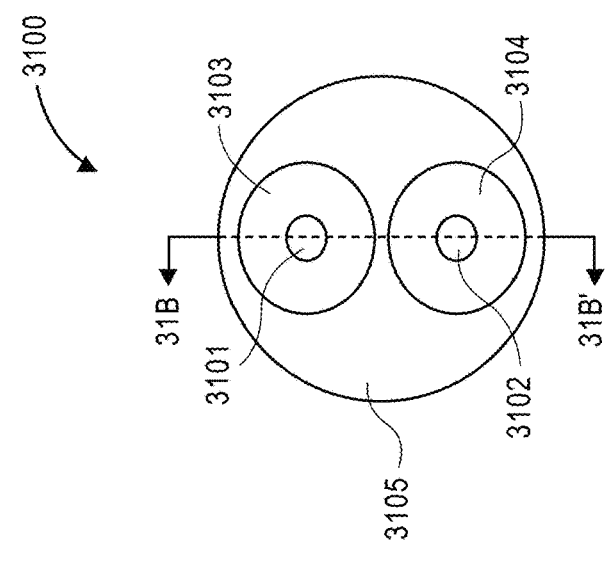
FIGS. 31A-31B illustrate cross-sectional views of example second lengths of a fiber assembly for confining adjusted beam characteristics and/or variable wavelengths.
Figure 31B:
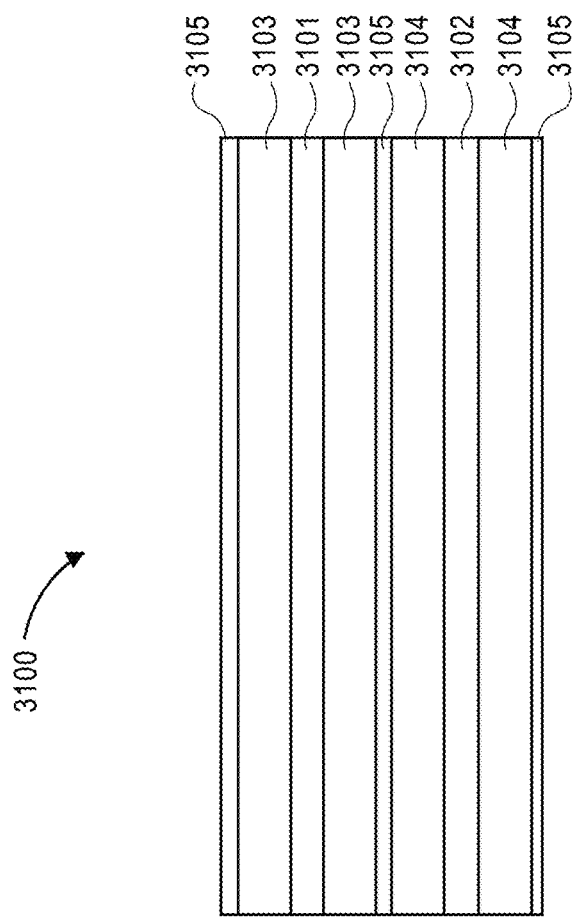

Illustrated in FIG. 31A is an axial cross-sectional view (end-face geometry) of a second length of fiber 3100 which may be implemented as the second length of fiber in a fiber assembly described above. FIG. 31B is a longitudinal cross-sectional view (length-wise geometry) of the fiber 3100 at cut-through line 31B-31B in FIG. 31A. In the second length of fiber 3100, the at least one wavelength-modifying confinement region comprises a plurality of confinement regions, such as a first wavelength-modifying region 3101 and a second wavelength-modifying confinement region 3102. An at least one passive confinement region 3105 encompasses both the first wavelength-modifying region 3101 and the second wavelength-modifying confinement region 3102. Passive confinement region 3105 is separated from the first wavelength-modifying confinement region 3101 and the second wavelength-modifying confinement region 3102 by first cladding structure 3103 and second cladding structure 3102, respectively.

In an implementation of a fiber assembly comprising the second length of fiber 3100, the first wavelength-modifying confinement region 3101 is a Raman cavity, a first center core of a first waveguide that is RE-doped with a first RE dopant or doped with a saturable absorber, and that can change a source optical beam's wavelength as it propagates through the second length of fiber, and the second wavelength-modifying confinement region 3102 is a Raman cavity, or a second center core of a second waveguide that is RE-doped with a second RE dopant and that can change a source optical beam's wavelength as it propagates through the second length of fiber. In such an implementation, a perturbation device of a fiber assembly as described above can be used to adjust a beam such that when the source beam is coupled to the wavelength-modifying confinement region 3101 or wavelength-modifying confinement region 3102, the source optical beam's initial wavelength ($\lambda 1$) is changed to an emission wavelength ($\lambda 2$) or ($\lambda 3$), wherein $\lambda 1$, $\lambda 2$, $\lambda 3$ are different from one another (two emission wavelengths using a constant pump wavelength). While in this implementation of second length of fiber 3100, a second waveguide is described above as comprising a second waveguide having a second doped core comprising a second RE dopant, other implementations are not so limited. Thus the second wavelength-modifying confinement region 3102 may be a second core of a second waveguide that is not RE-doped. In other words, region 3102 need not comprise a wavelength-modifying confinement region and may instead comprise a passive region. Additionally, while in this implementation the plurality of wavelength-modifying confinement regions are shown disposed in a 1×2 matrix, other implementations are not so limited and the second fiber length can comprise other configurations of the wavelength-modifying confinement regions, including a 2×2 matrix. Additionally, waveguides comprising wavelength-modified confinement regions are not necessarily limited to a particular shape and can be selected from among other geometries such as elliptical, oval, polygonal, square, rectangular, D-shaped or combinations thereof, as well as other designs described above.

Figure 32A:
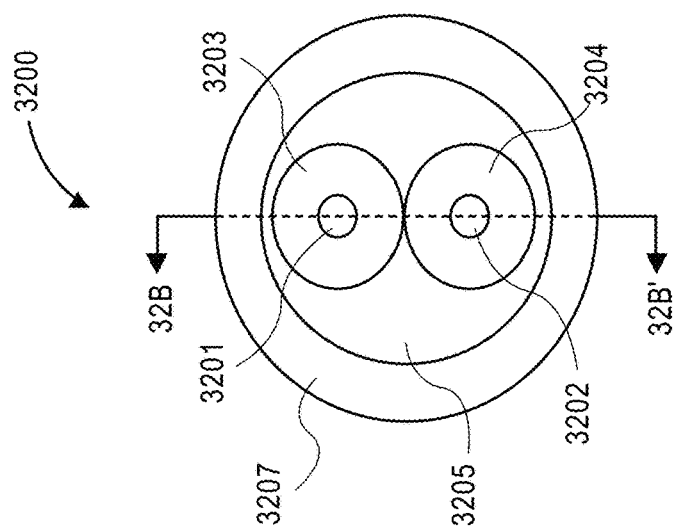
FIGS. 32A-32B illustrate cross-sectional views of example second lengths of a fiber assembly for confining adjusted beam characteristics and/or variable wavelengths.
Figure 32B:
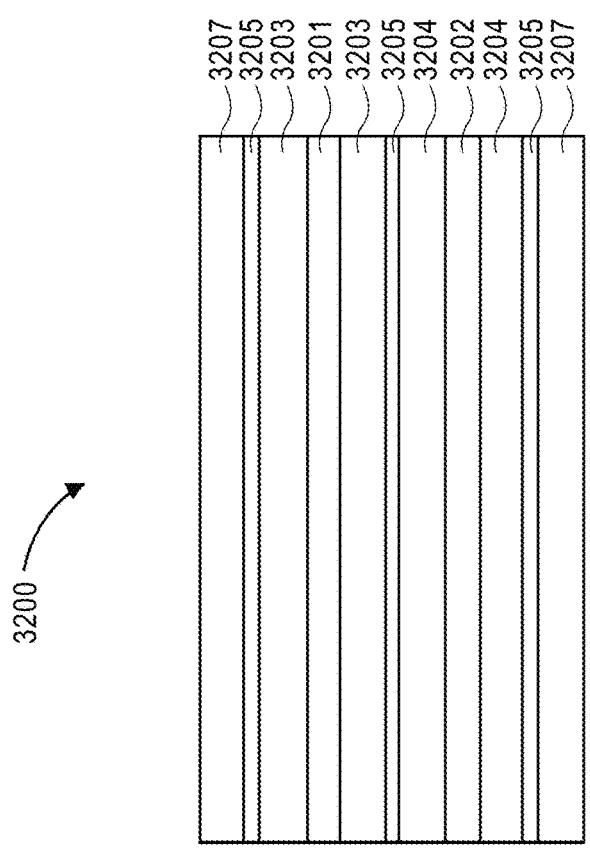
Figure 33A:
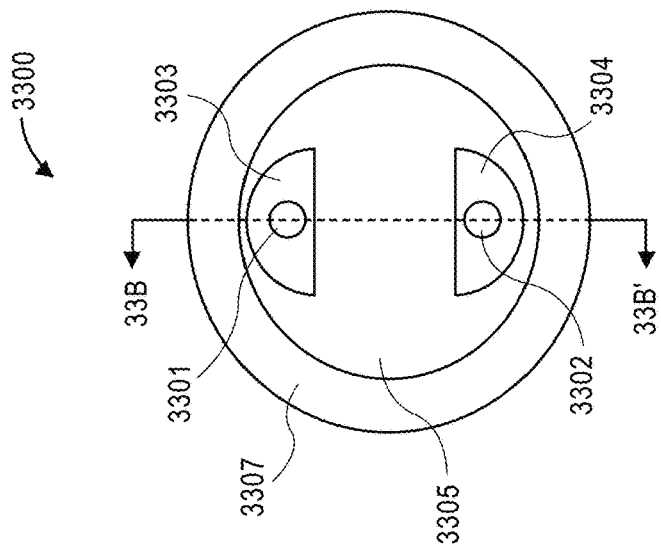
FIGS. 33A-33B illustrate cross-sectional views of example second lengths of a fiber assembly for confining adjusted beam characteristics and/or variable wavelengths.
Figure 33B:
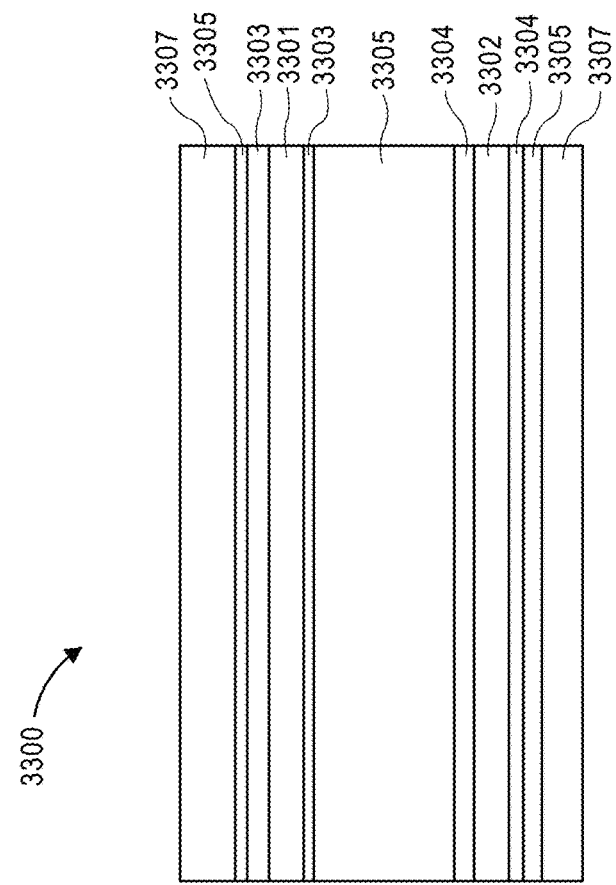

Illustrated in FIG. 32A is an axial cross-sectional view (end-face geometry) of a second length of fiber 3200 which may be a second length of fiber in a fiber assembly as described above. Here, the second length of fiber 3200 has a structure that is similar to that of second length of fiber 3100 of FIG. 31A except for a few differences including, for example, an outer passive structure 3207 that encompasses both the first wavelength-modifying region 3201 and surrounding cladding structure 3203, and the second wavelength-modifying region 3202 and surrounding cladding structure 3204. Corresponding FIG. 32B is illustrates a longitudinal cross-sectional view of the fiber 3200 according to cut-through line 32B-32B in FIG. 32A. The second length of fiber 3200 includes passive structure 3205/3207 that encompasses both the first wavelength-modifying region 3202 and the second wavelength-modifying region 3202 and through which the source optical beam can be transmitted.

In an implementation of a fiber assembly comprising the second length of fiber 3200, the first wavelength-modifying confinement region 3201 is a first Raman cavity or a first center core of a first waveguide that is RE-doped with a first RE dopant or doped with a saturable absorber and that can change a source optical beam's wavelength as it propagates through the second length of fiber, and the second wavelength-modifying confinement region 3202 is a second center core of a second waveguide that is RE-doped with a second RE dopant and that can change a source optical beam's wavelength as it propagates through the second length of fiber. In such an implementation, a perturbation device of a fiber assembly as described above can be used to adjust a beam such that when the source beam is coupled to the wavelength-modifying confinement region 3201 or wavelength-modifying confinement region 3102, the source optical beam's initial wavelength (λ1) is changed to an emission wavelength (λ2) or (λ), wherein λ1, λ2, λ3 are different from one another (two emission wavelengths using a constant pump wavelength). In such an implementation, the passive confinement region 3205/3207 is a waveguide that can transmit the pump beam directly through the second length of fiber without substantial changes to the source's wavelength. Accordingly, an optical beam coupled to the second length of fiber upon being launched from the first length can be emitted at the same wavelength (λ1) upon exiting the second length of fiber as its initial wavelength (λ1) (i.e., a laser source's wavelength is the emitted wavelength). While this description of second length of fiber 3200 is described as comprising a second waveguide having a second doped core comprising a second RE dopant, other implementations are not so limited. Thus the second wavelength-modifying confinement region 3202 may be a second core of a second waveguide that is not RE-doped. Additionally, while in this implementation the plurality of wavelength-modifying confinement regions are shown disposed in a 1×2 matrix, other implementations are not so limited and the second fiber length can comprise other configurations of the wavelength-modifying confinement regions, including a 2×2 matrix. Additionally, waveguides comprising wavelength-modified confinement regions are not necessarily limited to a particular shape and can be selected from among other geometries such as elliptical, oval, polygonal, square, rectangular, D-shaped or combinations thereof, as well as other designs described above.

Illustrated in FIG. 33A is an axial cross-sectional view (end-face geometry) of a second length of fiber 3300 which may be a second length of fiber in a fiber assembly as described above. Corresponding FIG. 33B is illustrates a longitudinal cross-sectional view of the fiber 3000 according to cut-through line 33B-33B in FIG. 33A. Here, the second length of fiber 3300 has a structure that is similar to that of second length of fiber 3200 of FIG. 32A except that the cladding structures 3301 and 3302 are D-shaped. The second length of fiber 3300 includes passive structure 3305/3307 that encompasses both the first wavelength-modifying region 3302 and the second wavelength-modifying region 3302 and through which the source optical beam can be transmitted.

The radial cross-sectional views illustrated in FIGS. 30A, 31A, 32A and 33A for the examples of second length of fiber 3000, 3100, 3200 and 3300, respectively, are not intended to being limiting with respect to the cross-sectional shapes of their respective wavelength-modifying confinement regions, passive confinement regions and/or cladding structures. In other words, the at least one confinement layer, at least one passive layer and the at least one cladding structure in each of second length of fiber 3000, 3100, 3200 and 3300 can comprise other geometries such as elliptical, oval, polygonal, square, rectangular, D-shaped or combinations thereof, as well as other designs.

Additionally, the cross-sectional views illustrated in FIGS. 30B, 31B, 32B and 33B for the examples of second length of fiber 3000, 3100, 3200 and 3300, respectively, are not intended to being limited, for example, with respect to thicknesses of their respective wavelength-modifying confinement regions, passive confinement regions and/or at least one cladding structures. In other words, the at least one confinement layer, at least one passive layer and the at least one cladding structure in each of second length of fiber 3000, 3100, 3200 and 3300 can varying thicknesses along a length of the second length of fiber.

Figure 34:
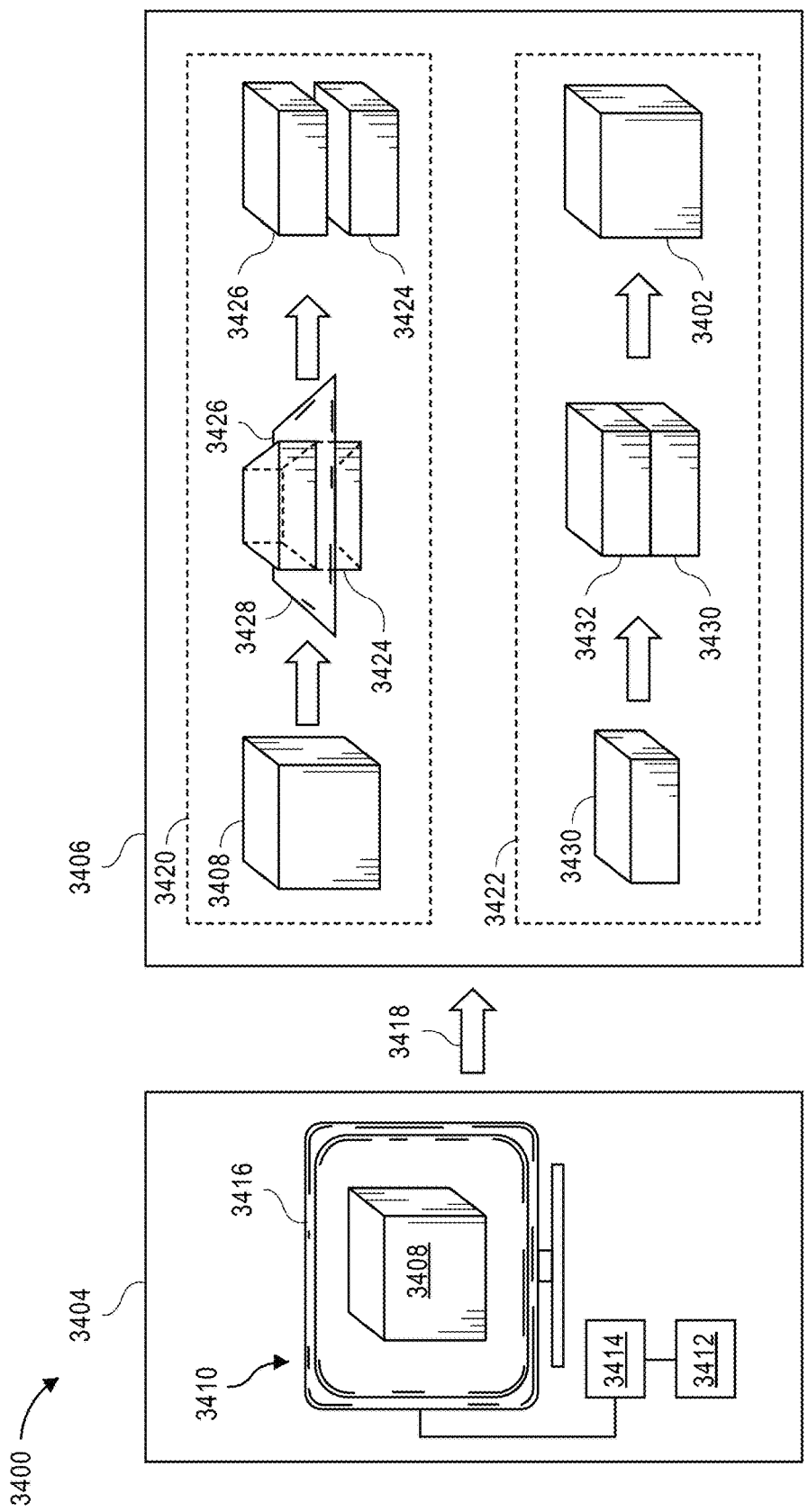
FIG. 34 illustrates a schematic of an exemplary system for fabricating an article from powdered materials via additive manufacturing.

FIG. 34 illustrates a schematic of an exemplary system 3400 for fabricating an article 3402 (e.g., a component) from one or more materials (e.g., powdered materials, monomers, etc.) via additive manufacturing or 3D printing, according to one or more embodiments. The system 3400 may include a computer aided design (CAD) assembly 3404 and a layering device 3406. The CAD assembly 3404 may include any software capable of providing or generating a geometry or digital model 3408 of the article 3402 in three dimensions. As further described herein, the layering device 3406 may utilize the digital model 3408 as a template or guide to fabricate the article 3402 in a layer-by-layer manner. The layering device 3406 may be or include any device (e.g., 3D printer) capable of fabricating the article 3402 using the digital model 3408 as a template.

The CAD assembly 3404 may include at least one computer 3410 having a memory 3412 (e.g., hard drives, random access memory, flash memory, etc.), one or more central processing units (one is shown 3414), one or more input devices (e.g., keyboard and mouse) (not shown), one or more monitors 3416 on which a software application can be executed, or any combination thereof. The memory 3412 may store an operating system and/or any programs or software capable of providing or generating the digital model 3408. The central processing unit 3414 may work in concert with the memory 3412 and/or the input devices (not shown) to perform tasks for a user or operator. The central processing unit 3414 may be automated or may execute commands at the direction of the user. The computer 3410 may interface with one or more databases, support computers or processors, the Internet, or any combination thereof. As used herein, the term "interface" may refer to all possible internal and/or external interfaces, wired or wireless. It should be appreciated that while FIG. 34 illustrates the computer 3410 as a platform on which the methods discussed and described herein may be performed, the methods may also be performed on any other platform or device having computing capabilities. For example, the layering device 3406 may include a platform or device capable of generating the digital model 3408. In another example, a mobile device (e.g., tablet, cellphone, etc.) may provide the platform on which the methods discussed and described herein may be performed.

The digital model 3408 may include information or data defining one or more portions of the article 3402. For example, the digital model 3408 may include 3D numerical coordinates of an entire geometry of the article 3402. The digital model 3408 may define an inner surface, an outer surface, and/or a volume of the article 3402 to be fabricated by the layering device 3406. The digital model 3408 may be communicated to the layering device 3406, as illustrated by arrow 3418, and may provide the template to fabricate the metallic article 3402.

The layering device 3406 may fabricate the article 3402 from the digital model 3408 in one or more processes (two are shown 3420, 3422). A first process 3420 for fabricating the article 3402 from the digital model 3408 may be or include a digital process. The digital process 3420 may include dividing or partitioning the digital model 3408 into two or more digital layers or digital cross-sections (two are shown 3424, 3426) using one or more digital horizontal planes (one is shown 3428). For example, as illustrated in FIG. 34, the digital process 3420 may include partitioning the digital model 3408 into successive digital cross-sections 3424, 3426, which may be two dimensional (2D) or 3D. It should be appreciated that the layering device 3406 may divide or partition the digital model 3408 into any number of digital cross-sections 3424, 3426 using any number of digital horizontal planes 3428. Each of the digital cross-sections 3424, 3426 may provide a template to fabricate at least a portion of the article 3402. For example, as illustrated in FIG. 34, each of the digital cross-sections 3424, 3426 may provide a template to fabricate each of the layers 3430, 3432 of the article 3402 in a second process 3422. The digital cross-sections 3424, 3426 may include data defining the respective layers 3430, 3432 of the article 3402. For example, a first digital cross-section 3424 may include data defining a first layer 3430 of the article 3402, and a second digital cross-section 3426 may include data defining a second layer 3432 of the article 3402. Each of the digital cross-sections 3424, 3426 may include data defining an outer cross-sectional line, an inner cross-sectional line, a cross-sectional area, a volume, or any combination thereof. The respective inner and outer cross-sectional lines of each of the digital cross-sections 3424, 3426 may define respective inner and outer surfaces of each of the layers 3430, 3432 of the article 3402. Further, the respective cross-sectional area of each of the digital cross-sections 3424, 3426 may at least partially define a respective volume of each of the layers 3430, 3432.

As previously discussed, the layering device 3406 may fabricate the article 3402 from the digital model 3408 in one or more processes 3420, 3422, and the digital process 3420 may include partitioning the digital model 3408 into the digital cross-sections 3424, 3426. The second process 3422 for fabricating the article 3402 from the digital model 3408 may include fabricating each of the layers 3430, 3432 of the article 3402 from the material (e.g., powdered materials, monomers, etc.). For example, the second process 3422 may include sequentially forming each of the layers 3430, 3432 of the article 3402 using the respective digital cross-sections 3424, 3426 as a template. The second process 3422 may also include binding the layers 3430, 3432 with one another to build or form the article 3402. Any number of layers 3430, 3432 may be formed and/or bound with one another to form the article 3402.

In an exemplary operation, illustrated in FIG. 34, the layering device 3406 may fabricate the article 3402 by forming the first layer 3430, forming the second layer 3432, and combining or binding the first and second layers 3430, 3432 with one another. The first layer 3430 may be formed on a substrate (not shown) configured to support the first layer 3430 and/or any subsequent layers. Any one or more of the layers 3430, 3432 formed by the layering device 3406 may provide or be a substrate for any subsequent layers deposited by the layering device 3406. For example, the first layer 3430 deposited by the layering device 3406 may be or provide the substrate for the second layer 3432 or any subsequent layers. In at least one embodiment, the formation of the second layer 3432 and the binding of the second layer 3432 to the first layer 3430 may occur simultaneously or concurrently. For example, the process of forming the second layer 3432 may at least partially bind the second layer 3432 to the first layer 3430. In another embodiment, the formation of the second layer 3432 and the binding of the second layer 3432 with the first layer 3430 may occur sequentially. For example, the second layer 3432 may be formed adjacent or atop the first layer 3430 in one process, and the second layer 3432 may be bound, fused, or otherwise coupled with the first layer 3430 in a subsequent process (e.g., a heating process). The layering device 3406 may bind or fuse the first layer 3430, the second layer 3432, and/or any subsequent layers (not shown) with one another to fabricate the article 3402.

The formation and binding of the layers 3430, 3432 in the second process 3422 may include a process that utilizes a laser light source and a VBC fiber and/or an optical beam system or the fiber assembly thereof, as discussed above. Illustrative processes for the formation and binding of the layers 3430, 3432 in the second process 3422 may include, but is not limited to, selective laser sintering (SLS), stereolithography (SL), direct metal laser fusion (DMLF), direct metal laser sintering (DMLS), direct metal deposition (DMD), laser engineered net shaping (LENS), select laser melting (SLM), electron beam melting (EBM), electron beam direct manufacturing (EBDM), or the like. or a modification thereof.

In at least one embodiment, the materials used to form each of the layers 3430, 3432 may include particles or stock materials, such as powders or particulates of a material. Illustrative materials used to form each of the layers 3430, 3432 may be or include, but are not limited to, powdered metals, powdered alloys, elemental powders of chemical elements (e.g., the metals, the metalloids, and/or the non-metals) or constituents of the metal alloy, ceramics, polymers, monomers, biomaterials, and the like, or combinations thereof.

Figure 35:
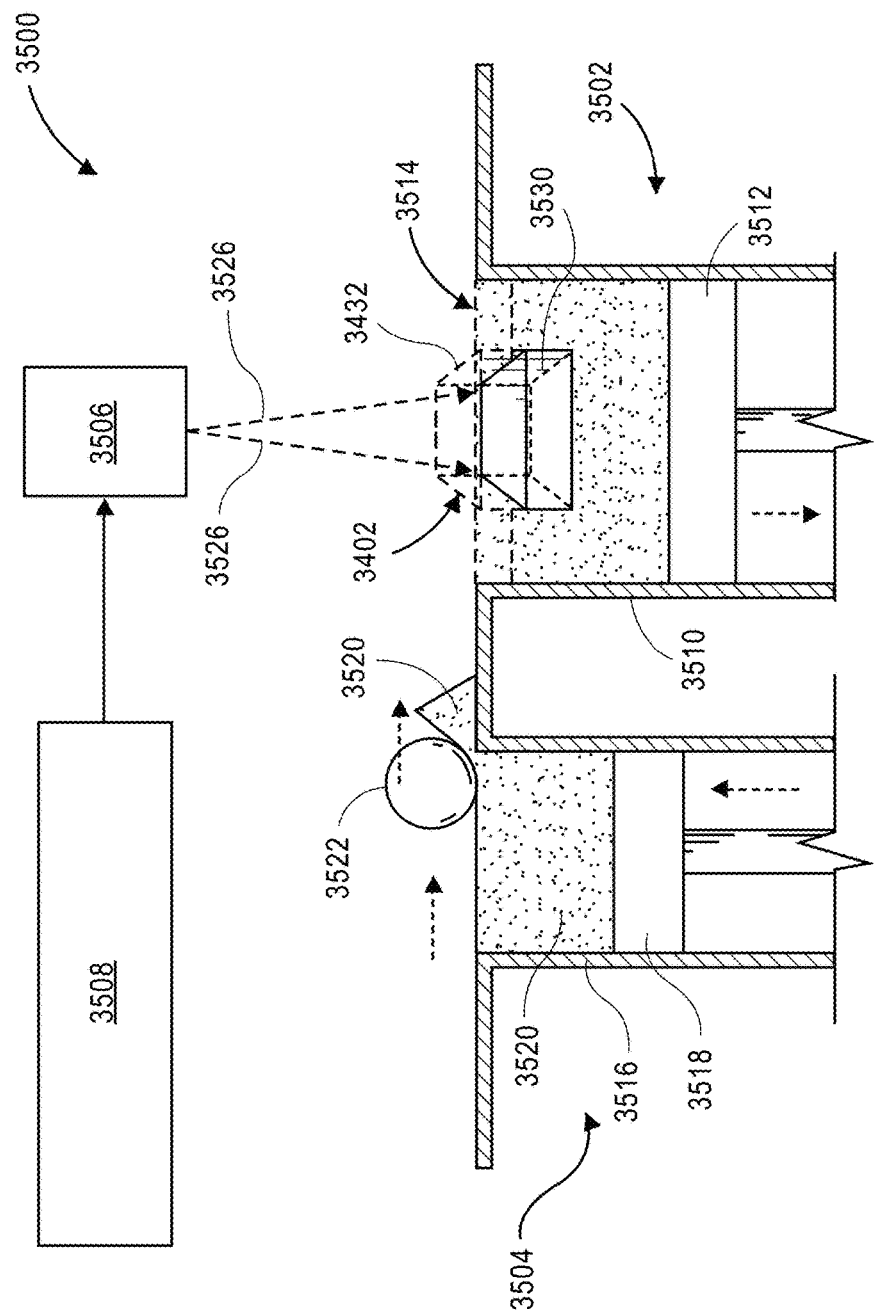
FIG. 35 illustrates a schematic of an exemplary layering device for forming and binding the layers of the article of FIG. 34.

FIG. 35 illustrates another exemplary layering device 3500 that may be utilized in the system 3400 of FIG. 34, according to one or more embodiments. The layering device 3500 may be configured to form and/or bind the layers 3430, 3432 (see FIG. 34) with one another to form the article 3402. The layering device 3500 may also be configured to carry out or perform a process that utilizes a laser light source and a VBC fiber and/or an optical beam system or the fiber assembly thereof, as detailed above. As illustrated in FIG. 35, the layering device 3500 may include a fabrication assembly 3502, a powder assembly 3504, a scanner 3506, and a heat source 3508, such as a laser, or any combination thereof. As further illustrated in FIG. 35, the fabrication assembly 3502 may include a feedstock or powder container 3510 configured to contain a build material 3520 (e.g., the powdered materials) and having a component support 3512 disposed therein. The component support 3512 may be configured to carry or hold the article 3402 during one or more fabrication processes of the layering device 3500. The component support 3512 may be adjustable or movable within the build container 3510 in a vertical direction (e.g., z-axis) and may be movable to define a working volume 3514 (shown in phantom) of the layering device 3500. The powder assembly 3504 may include a powder chamber 3516 having a delivery support 3518 configured to support the powdered materials 3520. The delivery support 3518 may be adjustable or movable within the powder chamber 3516 in the vertical direction (e.g., z-axis). The powder assembly 3504 may also include a roller or wiper 3522 configured to transfer at least a portion of the powdered materials 3520 from the powder assembly 3504 to the fabrication assembly 3502.

In at least one embodiment, the scanner 3506 may focus or direct an energy beam, illustrated by arrows 3526, along the working volume 3514 to fuse the materials 3520 contained in the working volume 3514 with one another to form the layers 3430, 3432 of the article 3402. For example, the scanner 3506 may be operably coupled with a laser light source and a VBC fiber and/or an optical beam system or the fiber assembly thereof (as discussed above), such as a laser 3508, and configured to focus or direct the laser 3526 along the working volume 3514 to fuse the materials 3520 contained in the working volume 3514 with one another to form the layers 3430, 3432 of the article 3402. In another embodiment, the laser 3508 may be translated or moved along an x-axis and/or a y-axis to direct the energy beam 3526 thereof along the working volume 3514. For example, the laser 3508 may be mounted with a movable platform or frame (not shown) configured to translate the laser 3508 along the x-axis and/or the y-axis.

In at least one embodiment, the scanner 3506 may include a laser light source and a VBC fiber and/or an optical beam system or the fiber assembly thereof disposed therein. In another embodiment, the laser light source and a VBC fiber and/or an optical beam system or the fiber assembly thereof may be interposed and operably coupled with the laser 3508 and the scanner 3506. In yet another embodiment, the a laser light source and a VBC fiber and/or an optical beam system or the fiber assembly thereof may be operably coupled with and disposed downstream from the scanner 3506. The VBC fiber 100 may be configured to receive a beam from the laser 3508 operably coupled therewith, vary the characteristics of the beam 3526, and/or direct the beam 3526 along the working volume 3514.

In an exemplary operation of the layering device 3500 with continued reference to FIG. 35, the delivery support 3518 may be raised in the vertical direction to supply a portion of a powdered materials 3520 disposed in the powder chamber 3516 to the wiper 3522, and the component support 212 may be lowered to provide an empty volume (i.e., the working volume 3514) in the build container 210. The wiper 3522 may spread or otherwise push the portion of the powdered materials 3520 from the powder assembly 3504 to the empty volume in the build container 3510 to thereby form the working volume 3514 of the powdered materials 3520 in the fabrication assembly 3502. The laser 3508 and/or the scanner 3506 may emit or otherwise focus the energy beam 3526 onto the powdered materials 3520 contained in the working volume 3514 to selectively melt, sinter, or otherwise fuse at least a portion of the powdered materials 3520 with one another to form the first layer 3430 of the article 3402. For example, the energy beam 3526 may selectively melt or fuse the powdered materials 3520 into larger structures or agglomerations (e.g., molten powdered materials) by rapidly melting the powdered materials 3520. As the energy beam 3526 moves along the working volume 3514 to melt or fuse the powdered materials 3520, heat may be conducted from the previously melted or molten region of the working volume 3514 to thereby rapidly cool and solidify the molten powdered materials 3520.

After forming the first layer 3430 of the article 3402, the component support 3512 may be lowered to thereby lower the first layer 3430 of the article 3402, and the delivery support 3518 may be raised to supply another portion of the powdered materials 3520 from the build container 3516 to the wiper 3522. The wiper 3522 may spread the portion of the powdered materials 3520 from the powder assembly 204 to the build container 3510 to thereby form another working volume 3514 of the powdered materials 3520 in the fabrication assembly 3502. The laser 3508 may emit the energy beam 3526 onto the powdered materials 3520 forming the working volume 3514 to selectively melt at least a portion of the powdered materials 3520 into the larger structures or agglomerations (e.g., the molten powdered materials). Heat may be conducted from the previously molten region of the working volume 3514 to thereby rapidly cool and solidify the molten powdered materials 3520 to the metal alloy and form the second layer 3432 (shown in phantom) of the article 3402. The fabrication process may be repeated to build the successive layers 3430, 3432 of the article 3402. As previously discussed, the formation of the second layer 3432 may bind or couple the second layer 3432 with the first layer 3430. Further, as previously discussed, the second layer 3432 may be coupled with the first layer 3430 in a subsequent process (e.g., a heating and/or pressing process).

It should be appreciated that utilizing a laser light source and a VBC fiber 100 and/or an optical beam system or the fiber assembly thereof in the layering device 3500 may allow one or more characteristics of the laser 3508 or the beam 3526 thereof to be varied. For example, a laser light source and the VBC fiber 100 and/or an optical beam system or the fiber assembly thereof may vary a wavelength of the beam 3526 provided by the laser. The ability to vary the wavelength may allow the layering device 3500 to utilize a wider range of materials and/or to combine various materials in the fabrication process. The ability to vary the wavelength may also allow a single layering device 3500 to be utilized with a wider range of materials.

Figure 36:
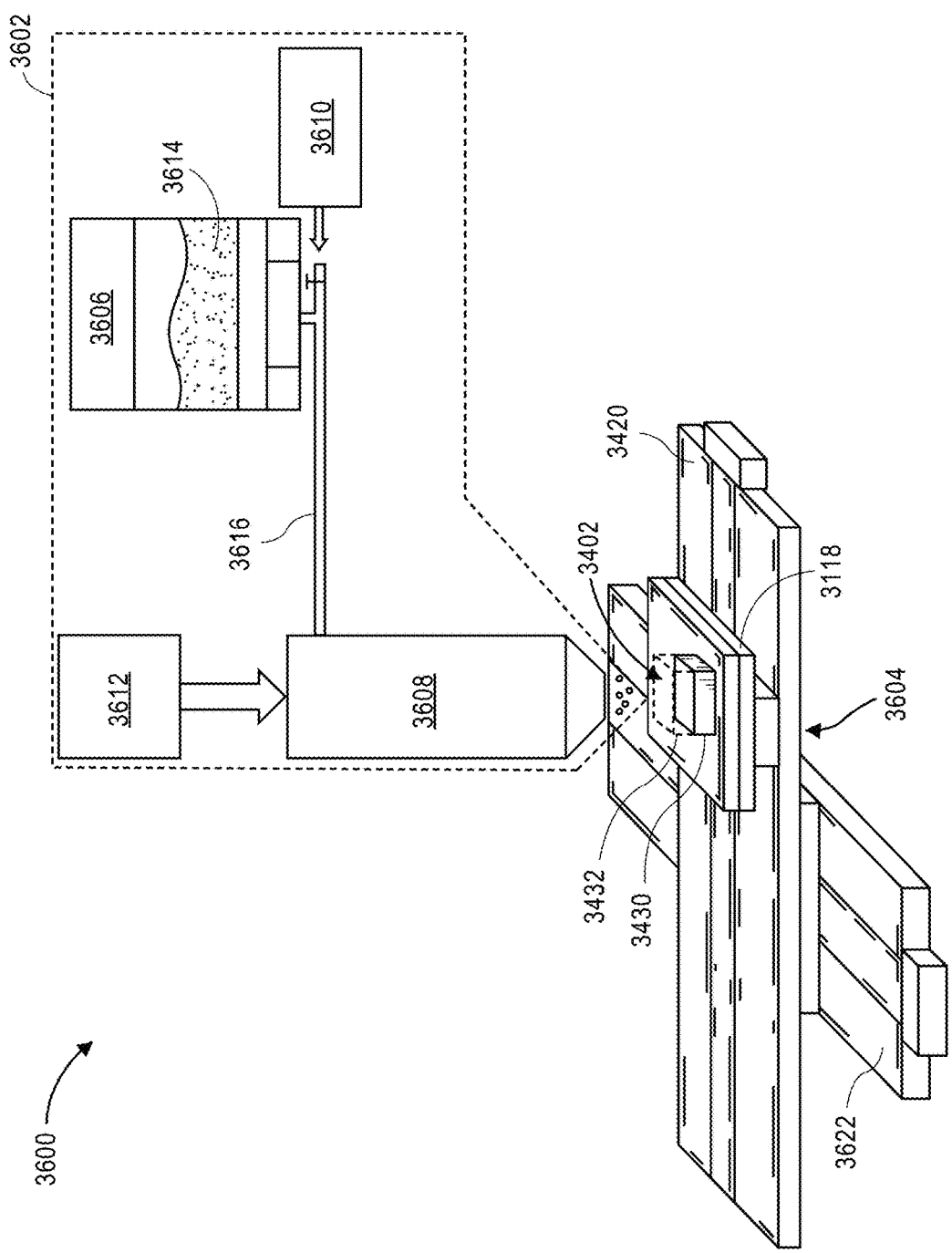
FIG. 36 illustrates a schematic of another exemplary layering device for forming and binding the layers of the article of FIG. 34.

While an SLS process is described herein with reference to FIGS. 34 and 35, other suitable additive manufacturing or 3D printing processes may also be employed to fabricate the article 3402. For example, FIG. 36 illustrates another exemplary layering device 3600 that may be utilized in the system 3400 of FIG. 34, according to one or more embodiments. The layering device 3600 may be configured to form and/or bind the layers 3430, 3432 (see FIG. 34) with one another to form the article 3402. As illustrated in FIG. 36, the layering device 3600 may include a fabrication assembly 3604 and a stage 3604 (e.g., an x,y-axis stage). The layering device 3600 may be configured to carry out or perform a DMD or similar process or a modification thereof. For example, the layering device 3600 may be configured to deposit successive layers 3430, 3432 of molten powdered materials onto a substrate 3618 and/or the layers 3430, 3432 of the article 3402.

The fabrication assembly 3602 may include a powder feeder 3606, a deposition nozzle 3608, a gas supply 3610, a heat source or laser 3612, a VBC laser 100 operably coupled with the laser 3612, or any combination thereof. The powder feeder 3606 may be configured to retain and dispense a build material 3614 (e.g., the powdered materials). For example, as illustrated in FIG. 36, the powder feeder 3606 may be configured to deliver the powdered materials 3614 to a conduit 3616 fluidly coupled therewith. The powdered materials 3614 may be dispensed from the powder feeder 3606 to the conduit 3616 at a controlled rate and subsequently mixed with a gas (e.g., inert gas) from the gas supply 3610. The gas from the gas supply 3610 may carry or feed the powdered materials 3614 to the deposition nozzle 3608 via the conduit 3616. The powdered materials 3614 may then be dispensed from the deposition nozzle 3608, melted by the laser 3612, and deposited onto the substrate 3618 to form each of the layers 3430, 3432 of the article 3402.

As previously discussed, the laser light source and a VBC fiber 100 and/or an optical beam system or the fiber assembly thereof may be operably coupled with the laser 3612. The laser light source and the VBC fiber and/or an optical beam system or the fiber assembly thereof may vary one or more characteristics of the beam from the laser 3612 to provide an adjusted beam. The laser light source and the VBC fiber and/or an optical beam system or the fiber assembly thereof may vary the characteristics of the beam in accordance with any of the embodiments discussed above.

As the powdered materials 3614 are deposited, the stage 3604 may be translated or moved in a desired pattern to form the first layer 3430 of the article 3402. The desired pattern may be determined by the digital model 3408 (see FIG. 34). The stage 3604 may be configured to move the substrate 3618 in two-dimensions. For example, the stage 3604 may include an X-axis track 3620 and a Y-axis track 3622 configured to move the substrate 3618 along an X-axis and a Y-axis, respectively. The deposition nozzle 3608 and/or the stage 3604 may be configured to move along a Z-axis. For example, the stage 3604 may be configured to be moved along the Z-axis to raise or lower the substrate 3618 relative to the deposition nozzle 3608.

It should be appreciated that utilizing the laser light source and the VBC fiber and/or an optical beam system or the fiber assembly thereof (as described above) in the layering devices 3500, 3600 may allow one or more characteristics of the respective lasers 3508, 3612 or the beams 3526 thereof to be varied. For example, the VBC fiber 100 may vary a wavelength of the beam 3526 provided by the lasers 3508, 3612. The ability to vary the wavelength may allow the layering devices 3500, 3600 to utilize a wider range of materials and/or to combine various materials in the fabrication process. The ability to vary the wavelength may also allow a single layering device 3500, 3600 to be utilized with a wider range of materials.

While the processes described herein with reference to FIGS. 34, 35, and 36 are directed to the utilization of a laser light source and a VBC fiber 100 and/or an optical beam system or the fiber assembly thereof for providing a laser beam having variable beam characteristics for melting or sintering powdered materials (e.g., powdered polymers, powdered metals, etc.), the laser light source and the VBC fiber and/or an optical beam system or the fiber assembly thereof may be suitable for other additive manufacturing or 3D printing processes and/or materials. For example, the laser light source and the VBC fiber and/or an optical beam system or the fiber assembly thereof disclosed herein may also be utilized for liquid materials, such as those utilized in stereolithography (SL). Stereolithography is a photopolymerization process in which a build tray may be submerged in a basin including liquid materials, such as liquid photosensitive materials. A laser, such as a laser provided by a VBC fiber 100 may solidify a portion of the liquid materials to fabricate one slice of the article or component to be manufactured onto the build tray. The build tray may then be submerged further, and the laser may solidify another portion of the liquid materials to fabricate another slice adjacent the first slice. It should be appreciated that the VBC fiber 100 may provide a laser beam at varying wavelengths to cure varying liquid materials (e.g., curable liquid polymers). For example, the VBC fiber 100 may be able to cure a first liquid material by providing a laser beam at a first wavelength and rapidly cure a second material by providing the laser beam at a second wavelength. It should be appreciated that the ability to rapidly change the wavelength of the laser beam via the VBC fiber 100 will allow the liquid materials to be rapidly changed and combined with one another to provide articles or components fabricated from composite materials (e.g., two or more cured liquid materials coupled with one another).

As described above, the optical beam delivery device can include a first length of fiber comprising a first refractive-index profile (RIP), a second length of fiber having a second RIP and being coupled to the first length of fiber, and a perturbation device configured to a perturbation device configured to modify one or more beam characteristics of an optical beam in one or more of the first length of fiber, in the second length of fiber, or in the first and second lengths of fiber. Thus, in an implementation method 3100 can further include launching the optical beam into the first length of fiber; coupling the optical beam into the second length of fiber; activating the perturbation device to modify one or more beam characteristics of the optical beam in the first length of fiber, in the second length of fiber, or in the first and second lengths of fibers; and confining at least a portion of the modified one or more beam characteristics of the optical beam within one or more confinement regions of the second length of fiber, wherein the first RIP differs from the second RIP.

The systems and methods described herein can be used for forming optical beams having rectangular beam shapes and/or for varying dimensions or aspect ratios of rectangular beam shapes. While various implementations are described with reference to optical fibers, other types of optical waveguides can be used having one or more confinement regions having square, rectangular, polygonal, oval, elliptical or other cross-sectional shapes. Optical fibers are typically formed of silica (glass) that is doped (or undoped) so as to provide predetermined refractive indices or refractive index differences. In some, examples, fibers or other waveguides are made of other materials such as fluorozirconates, fluoroaluminates, fluoride or phosphate glasses, chalcogenide glasses, or crystalline materials such as sapphire, depending on wavelengths of interest. Additionally, the forming of rectangular beams and/or varying of the dimensions or aspect ratios of rectangular beams can be performed in situ during material processing or between material processing runs.

One advantage of at least one implementation described in the present disclosure includes adjustment of beam shapes of optical beams used for heating processes by an optical beam delivery device rather by a large, more expensive zoom processing optic assembly.

Having described and illustrated the general and specific principles of examples of the presently disclosed technology, it should be apparent that the examples may be modified in arrangement and detail without departing from such principles. We claim all modifications and variation coming within the spirit and scope of the following claims.

We claim:

1. An additive manufacturing system for fabricating an article, comprising:
   a substrate; and
   a layering device configured to fabricate a first layer of the article on the substrate, the layering device comprising:
      an optical beam source configured to generate an optical beam; and
      a variable beam characteristics (VBC) fiber operably coupled with the optical beam source and configured to modify one or more beam characteristics of the optical beam, the VBC fiber including first and second lengths of fiber having, respectively, first and second refractive index profiles (RIPs) that are different from each other, the first RIP enabling, in response to an applied perturbation, modification of the one or more beam characteristics to form a modified optical beam having modified beam characteristics, and the second RIP defined by multiple confinement regions formed to confine, and situated to receive through a fiber-coupling interface functionally directly coupling the first and second lengths of fiber, at least a portion of the modified optical beam within at least one of the multiple confinement regions.

2. The additive manufacturing system of claim 1, further comprising a perturbation device operably coupled with the first length of fiber or the second length of fiber, the perturbation device being configured to modify the optical beam traversing through the first length of fiber to generate the modified optical beam.

3. The additive manufacturing system of claim 1, wherein the layering device further comprises a fabrication assembly, the fabrication assembly comprising:
- a feedstock container configured to contain a powdered feedstock; and
- an article support disposed in the feedstock container and configured to carry the article.

4. The additive manufacturing system of claim 3, wherein the layering device further comprises a powder assembly, the powder assembly comprising:
- a powder chamber configured to contain the powdered feedstock; and
- a delivery support disposed in the powder chamber and configured to support the powdered feedstock.

5. The additive manufacturing system of claim 4, wherein the fabrication assembly further comprises a roller configured to transfer a portion of the powdered feedstock from the powder assembly to the fabrication assembly.

6. The additive manufacturing system of claim 3, further comprising a scanner operably coupled with the VBC fiber and configured to receive the optical beam therefrom and direct the optical beam to the powdered feedstock disposed in the feedstock container.

7. The additive manufacturing system of claim 1, wherein the layering device further comprises a fabrication assembly, the fabrication assembly comprising a deposition nozzle operably coupled with the VBC fiber and configured to deliver a powdered feedstock to the substrate.

8. The additive manufacturing system of claim 7, wherein the fabrication assembly further comprises a powder feeder operably coupled with the deposition nozzle via a conduit, the powder feeder being configured to contain the powdered feedstock and deliver the powdered feedstock to the deposition nozzle.

9. The additive manufacturing system of claim 1, wherein the layering device is configured to fabricate the first layer of the article on the substrate from a powdered feedstock.

10. The additive manufacturing system of claim 1, wherein the layering device is configured to fabricate the first layer of the article on the substrate from a liquid feedstock.

11. The additive manufacturing system of claim 10, wherein the liquid feedstock comprises a liquid photosensitive material.

12. The additive manufacturing system of claim 1, further comprising a computer aided design assembly configured to provide a digital model of the article to the layering device.

13. The additive manufacturing system of claim 1, wherein the one or more beam characteristics comprises a wavelength of the optical beam.

14. The additive manufacturing system of claim 1, in which the first RIP is a waveguide configured to impart transverse displacement to the optical beam in response to the applied perturbation.

15. The multi-operation optical beam delivery device of claim 1, in which the optical beam source comprises an input fiber, and the first length of fiber including an input for receiving the optical beam from the input fiber.

16. The multi-operation optical beam delivery device of claim 15, in which the first length of fiber includes an output fused to an input of the second length of fiber.

17. The multi-operation optical beam delivery device of claim 1, in which the fiber-coupling interface includes an index-matching material.

18. The multi-operation optical beam delivery device of claim 1, in which the fiber-coupling interface includes a splice.

19. The multi-operation optical beam delivery device of claim 1, in which the fiber-coupling interface includes a fiber joint.

20. The multi-operation optical beam delivery device of claim 1, in which the fiber-coupling interface includes a connector.

21. The multi-operation optical beam delivery device of claim 1, in which the fiber-coupling interface maintains a substantially unaltered operative relationship between the first and second RIPs.

* * * * *